United States Patent [19]

Smith et al.

[11] Patent Number: 5,414,801
[45] Date of Patent: May 9, 1995

[54] COMPUTERIZED METHOD AND APPARATUS USING CONTAINMENT RELATIONSHIPS TO REPRESENT OBJECTS IN A THREE-DIMENSIONAL SPACE, AND FOR MOVING THERETHROUGH

[75] Inventors: David A. Smith, Cary; David W. Easter, Raleigh, both of N.C.

[73] Assignee: Virtus Corporation, Cary, N.C.

[21] Appl. No.: 714,387

[22] Filed: Jun. 11, 1991

[51] Int. Cl.⁶ .............................................. G06F 15/62
[52] U.S. Cl. ..................... 395/119; 395/120; 395/121; 345/157; 345/160; 345/161
[58] Field of Search ............... 395/119, 120, 121, 122, 395/125, 127, 141, 155, 161; 340/706, 709, 710; 345/157, 160, 161

[56] References Cited

U.S. PATENT DOCUMENTS

| | | |
|---|---|---|
| T912,012 | 7/1973 | Appel et al. |
| 3,816,726 | 6/1974 | Sutherland et al. ............ 395/127 X |
| 4,608,653 | 8/1986 | Setoguchi ........................ 340/729 X |
| 4,635,208 | 1/1987 | Coleby et al. ........................ 364/491 |
| 4,649,498 | 3/1987 | Kedem et al. ................... 340/747 X |
| 4,791,583 | 12/1988 | Colburn ........................... 340/703 X |
| 4,831,548 | 5/1989 | Matoba et al. .................. 340/724 X |
| 4,858,150 | 8/1989 | Aizawa et al. ................... 340/747 X |
| 4,862,392 | 8/1989 | Steiner .................................. 395/127 |
| 4,888,583 | 12/1989 | Ligocki et al. ....................... 340/729 |
| 4,918,625 | 4/1990 | Yan .................................. 340/703 X |
| 4,970,666 | 11/1990 | Welsh et al. ..................... 340/747 X |
| 5,003,498 | 3/1991 | Ota et al. ......................... 340/750 X |
| 5,095,303 | 3/1992 | Clark et al. ........................... 340/709 |
| 5,113,490 | 5/1992 | Winget ................................. 395/119 |
| 5,123,084 | 6/1992 | Prevost et al. ....................... 395/120 |
| 5,159,512 | 10/1992 | Evans et al. ......................... 395/119 |

OTHER PUBLICATIONS

"The Colony", M10304G (instruction manual), Mindscape, Inc., 1988.

"Virtus WalkThrough TM", User's Guide and Reference, 1990.

*Computer Graphics, Principles and Practice*, Foley et al., Addison-Wesley Publishing Company, Second Edition, 1990, pp. 213–217; 668–675; 701–715; 885–887, and 924–945.

Inside Machintosh, Apple Computer Corporation, vol. 1, Chapter 6, pp. I-135-I-162; I-181-I-187 (1982).

*Primary Examiner*—Almis Jankus
*Attorney, Agent, or Firm*—Bell, Seltzer, Park & Gibson

[57] ABSTRACT

A three-dimensional space may be rendered in a computer graphics system by representing the three-dimensional space as a plurality of convex polyhedra and representing the containment relationships among the plurality of convex polyhedra. Connection relationships among the convex polyhedra, including the location of holes in the connected surfaces, are also preferably represented. Containment and connection relationships are preferably represented using a containment logical tree and a connection logical graph. Three-dimensional graphics representations can thereby be rendered in a real time using a low cost, graphics processor. Efficient movement through three-dimensional space along all six degrees of freedom is also provided by using a two-dimensional pointing device, preferably a mouse, in combination with a function selector, preferably a pair of keys on the mouse. Use of the mouse without the function selection keys allows movement in a first plane in the three-dimensional space rendition, and use of the mouse in combination with the first function selection key allows movement in a second plane in the three-dimensional space rendition. Use of the mouse in combination with the second function key allows rotation in three-dimensional space rendition. Preferably, the six degrees of movement are implemented using predetermined combinations of mouse movement and function key selection to provide user intuitive movement through the three-dimensional space rendition along all six degrees of freedom.

45 Claims, 24 Drawing Sheets

CONTAINMENT TREE STRUCTURE

CONNECTION GRAPH STRUCTURE

CONNECTION GRAPH STRUCTURE WITH HOLES

[] = HOLE
⟶ = CONNECTION

COMPUTERIZED METHOD AND APPARATUS USING CONTAINMENT RELATIONSHIPS TO REPRESENT OBJECTS IN A THREE-DIMENSIONAL SPACE, AND FOR MOVING THERETHROUGH

FIELD OF THE INVENTION

This invention relates to computer-based graphics processing and more particularly to three-dimensional, computer-based graphics processing.

BACKGROUND OF THE INVENTION

High performance computers and work stations are used extensively for three-dimensional graphics processing. In three-dimensional graphics processing, one or more three-dimensional images is displayed on a two-dimensional graphics display such as a high resolution graphics screen. Computer Aided Design (CAD) systems allow users to create a three-dimensional representations using lines, points and vectors. Three-dimensional image data may be used in the drafting and documentation phases of product design, and may also be used to control product manufacture.

Product designers, such as architects and engineers, still begin the design process on paper and communicate design concepts on paper. Although CAD has succeeded at automating drafting, documentation and manufacturing it has met with limited success at "visualization".

Visualization is the first step in creating a spatial design. Visualization allows a user to create, explore, change, interact with and share a complete simulation of a three-dimensional world. It would be highly desirable for a designer to use the computer to create, modify and observe a three-dimensional space.

Unfortunately, Computer-Aided Visualization (CAV) has not been heretofore used extensively because of two main problems. First, the creation and manipulation of objects in three-dimensional space on a computer typically requires high performance computers or workstations to produce real-time visualization. Second, efficient techniques have heretofore not been available for moving an observer through a three-dimensional space on a graphics display along all six degrees of freedom. Each of these problems will be described in detail.

The creation of a three-dimensional space on a two-dimensional display is often referred to as "rendering". It is difficult to perform rendering in real time using conventional graphics techniques. A major problem in real time rendering is determining spatial priority. That is, it is difficult to calculate which objects are in front of other objects from a particular point of view or reference position.

A number of techniques have been developed to determine spatial priority. Many of these techniques are described in a textbook entitled *Computer Graphics, Principles and Practice*, by Foley et al. (Second Edition, 1990) published by Addison-Wesley Publishing Company, Inc., the disclosure of which is hereby incorporated herein by reference. However, these techniques have been so resource intensive that real time rendering typically cannot be performed without the use of expensive supercomputers or workstations.

One technique which has been used to render a three-dimensional space is referred to as a "z-buffer". See the Foley et al. text, pages 668–672. In a z-buffer, a separate buffer is provided which includes a depth field for each pixel on the two-dimensional display. When a three-dimensional space is rendered on the display, a new value in the z-buffer is calculated for every pixel. The newly calculated depth is then displayed on a graphics display using well known techniques. Since repositioning of the three-dimensional data requires a recalculation of the depth value for each pixel, this technique is very resource intensive.

A second technique for recreating a three-dimensional space in a graphics computer system is referred to as "ray tracing" or "ray casting". See the Foley et al. textbook, pages 701–715. In this technique, the visibility of surfaces is determined by tracing imaginary rays of light from the viewer's eye to the objects in the scene. Since large numbers of rays must be traced in order to produce a high quality image of spatial priority, this technique also is typically not a real time technique unless high performance computers are used.

Binary space partitions have also been used for three-dimensional rendering. See the Foley et al. textbook, pages 701–715. Binary space partitioning breaks the three-dimensioned space into a plurality of smaller spaces and each smaller space is rendered individually. The rendered smaller spaces are then combined. Again, this technique is resource intensive.

Yet another technique for three-dimensional rendering is the "painters algorithm" also referred to as a "depth-sort" algorithm. See the Foley et al. text, pages 673–675. In the painters algorithm, the farthest objects are first rendered and then closer objects are rendered on top of the farther objects, with the closer objects masking the farther objects. Since this requires all of the objects in the three-dimensional space to be redrawn every time a viewing position is changed, the algorithm is time consuming.

A final technique used for three-dimensional rendering is "scan line" technique. See the Foley et al. text pages 885–887. The three-dimensional space is scanned pixel by pixel and rendered pixel by pixel. Since the rendering is performed individually for each pixel, this technique is highly resource intensive.

In summary, the rendering of a three-dimensional space from a particular point of view is extremely time consuming because spatial priority determination is resource intensive. Accordingly, real time rendering has been difficult to perform on conventional desktop or personal computers.

The second major problem in real time three-dimensional computer aided visualization is allowing an observer or reference point to easily move in the three-dimensional computer-generated scene along all six degrees of freedom. As is well known to those having skill in the art, an observer of a real three-dimensional space can move in six degrees of freedom by walking through the space and turning his head. The six degrees of freedom are translation along three orthogonal axis (often referred to as x, y and z axis) and rotation about the three orthogonal axis (often referred to as roll, pitch, and yaw).

Unfortunately, typical computer input devices which control movement through computer generated three-dimensional scenes have been either a keyboard or a joystick. The keyboard is an unnatural movement input device because it requires multiple keystrokes to move forward, or it assumes a velocity set by numeric keys and uses other keys to change directions. Joysticks are an improvement over the keyboard but are useful primarily for airplane simulators where user control about six degrees of freedom is not required. The joystick typically assumes a forward velocity, and the viewer uses the joystick to modify direction. There have also been a number of mouse based control systems used with computer based flight simulators, but these have typically been based upon the control system used by the joystick.

One attempt to improve the freedom of movement in a graphics display of a three-dimensional space has been implemented in a computer adventure game entitled "The Colony" which is described in a manual entitled "The Colony" published in 1988 by Mindscape, Inc. In this computer game, a cartesian grid was overlaid on top of the computer generated image, where the center of the grid is the center of the image. When the mouse is at this exact center, no motion occurs. As the mouse is moved up along the vertical axis from the center, the observer's position begins to move forward through the three-dimensional space. The distance from the center determines the speed of forward movement. Return the mouse to the center causes all motion to cease. If the user moves the mouse vertically downward from the center, the observer's position begins to move backwards. Again, the distance from the center determines velocity. The user can turn by moving the mouse along the horizontal axis. Movement to the left makes the observer turn left. The angular velocity of the turn is determined by the distance from the center. Movement to the right makes the observer turn to the right, with the angular velocity being determined by the distance from the center.

The above described movement input technique allows the reference position or observer to stop and walk backward. However, this technique does not allow the observer to efficiently move along all six degrees of freedom. In particular, it does not allow the user to easily move directly to the left or right, to change altitude, to change pitch or to change roll.

In summary, there is a great need in three-dimensional graphics processing, for real time three-dimensional rendering which allows a user to move through the three-dimensional space in real time along all six degrees of freedom, and which can be implemented using low cost personal computers.

SUMMARY OF THE INVENTION

It is therefore an object of the invention to provide an improved computerized method and apparatus for representing a three-dimensional space.

It is another object of the present invention to provide an improved method and apparatus for rendering a three-dimensional space on a two-dimensional graphics display in real time.

It is yet another object of the present invention to allow a user to efficiently move through a three-dimensional space rendering along all six degrees of freedom.

It is yet another object of the present invention to provide three-dimensional rendering and six degrees of freedom movement, without the need for supercomputers or specially designed high performance graphics workstations.

These and other objects are provided in a computer graphics method and apparatus which represents a three-dimensional space as a plurality of convex polyhedra. A convex polyhedron is a three-dimensional spatial structure which is completely bounded by a plurality of flat surfaces, such that a line between any two points inside the polyhedron does not cross any of the surfaces which define the polyhedron. Examples of convex polyhedra are a cube and a pyramid.

According to the invention, since each convex polyhedron includes an interior and an exterior, a polyhedron can contain one or more polyhedra and can be contained in another polyhedron. Accordingly, the computer-based representation of the present invention also includes means for indicating containment relationships among the plurality of convex polyhedra.

By modeling objects in a three-dimensional space using convex polyhedra having containment relationships among one another, three-dimensional rendering may be performed in real time without high performance computers. Real time rendering may be performed because the calculations for rendering from a predetermined reference point are greatly simplified. In particular, if the reference point is outside a particular polyhedron, all polyhedra contained within that polyhedron are not visible from outside it, and need not be rendered in recreating the three-dimensional space. Similarly, if the reference point is completely contained within a polyhedron, polyhedra outside this polyhedron also cannot be seen. Accordingly, these polyhedra need not be considered in producing the rendering.

The present invention only requires calculation of the position of those polyhedra which can be seen from the reference position, based upon the containment relationships. The entire three-dimensional space need not be rendered each time the reference position moves. High speed, real time rendering is thereby provided.

It will be understood by those having skill in the art that objects contained within a polyhedron, or in which the polyhedron are contained, may need to be at least partially rendered if the polyhedron includes a hole in one or more of the surfaces thereof. According to the invention, the relevant images of polyhedra may be rendered through holes by also representing connection relationships among the surfaces of each of the plurality of convex polyhedra. Holes in the connected surfaces are also indicated. By allowing holes between logically connected surfaces of two polyhedra, a rendering between the interiors of polyhedra may be performed, without having to conduct lengthy search operations to determine if the polyhedra are visible, and to find other polyhedra which are not in fact visible but whose images overlap the hole.

In a preferred embodiment of the present invention, two logical structures are maintained to define the relationships among the convex polyhedra of the three-dimensional space. The tree structure is a tree indicating the containment relationships among the convex polyhedra. This logical structure for indicating containment will be referred to as a "containment tree". The second logical structure is a bidirectional graph which specifies the connections among polyhedra surfaces and also indicates where the connections include a hole. This allows the renderer to quickly determine what is on the other side of a hole in a polyhedron. This logical structure will be referred to as a "connection graph". These two structures are used by the graphics renderer to create a computer-generated three-dimensional graphic image in real time.

The present invention also allows efficient movement through the three-dimensional space along all six degrees of freedom. A two-dimensional pointing means, such as a mouse, trackball, joystick or other two dimensional pointing means, is used, in combination with a function selection means. The combination allows the two-dimensional pointing means to move the reference in a second plane in the three-dimensional space in response to selection of the function selection means and movement of the two-dimensional pointing means. In other words, use of the two-dimensional pointing means without the function selection means allows movement in a first plane in the three-dimensional space, whereas movement of the two-dimensional pointing means when the function selection means has been selected allows movement in a second plane in the three-dimensional space rendition. Another function selection means may also be provided to allow rotation in the three-dimensional space rendition when the two-dimensional pointing means and the second function selection means are selected. This allows six degrees of movement using the two-dimensional pointing means.

In a preferred embodiment of the present invention, the two-dimensional pointing means is a mouse and the two function selecting means are two keys on the mouse or two keys on the keyboard.

According to another aspect of the invention, user inputs from the two-dimensional pointing means and the first and second function selection means may be processed, as described below, to provide efficient user movement in a three-dimensional space along all six degrees of freedom. In particular, when neither the first nor the second function selection means are selected, vertical movement of the two-dimensional pointing means translates the reference forward/backwards through the three-dimensional space rendition, and horizontal movement of the two-dimensional pointing means rotates the reference point to change the yaw. In other words, using the mouse without the function keys allows the viewer to "move forward", "move backwards", "turn left", and "turn right".

Vertical movement of the pointing means when the first function selection key is selected, moves the viewer up/down through the three-dimensional space axis, and horizontal movement of the pointing means when the first function selection key is selected translates the reference left/right. In other words, use of the mouse and the first selection key allows the reference point to "rise up", "sink down", "pan left" or "pan right".

Finally, when the second function key is selected, and the mouse is moved vertically, rotation is provided to change the pitch. When the mouse is moved horizontally and the second function key is selected, rotation is provided to change the roll. In other words, use of the mouse and the second function key provides a "look up", "look down", "roll left" and "roll right" function. Accordingly, the use of the mouse in combination with two selection keys allows movement along six degrees of freedom in a user-intuitive manner.

The computer-based representation of a three-dimensional space including means for indicating containment relationships among a plurality of convex polyhedra, and means for indicating connection relationships among the surfaces of the plurality of convex polyhedra, may be used to efficiently represent a three-dimensional space on a two-dimensional display. The method and apparatus for moving through a computer-generated three-dimensional space including the function selection means and the two-dimensional pointing means, allows movement along six degrees of freedom through the three-dimensional space rendition in an intuitive and user friendly manner. The three-dimensional space representation of the present invention may be used with other techniques for moving through a computer-generated three-dimensional space rendition. Moreover, the technique for moving through a computer-generated three-dimensional space representation may be used in conjunction with other computer-based representations of three-dimensional space. However, the representation of a three-dimensional space and the technique for moving through a three-dimensional space representation, when used in combination, allows a real time computer aided visualization system to be produced which can operate on relatively low performance computers. Efficient computer aided visualization is thereby provided.

The present invention has been embodied in a computer program entitled Virtus WalkThrough TM, and has been marketed by the assignee of the present invention Virtus Corporation, Cary, N.C., since Nov. 15, 1990. The computer program instructions for Virtus WalkThrough TM are hereby incorporated herein by reference, as is the user manual for Virtus WalkThrough TM entitled "Virtus Walk Through User's Manual". The present invention was first publicly demonstrated by the assignee of the present invention at the Architecture, Engineering and Construction (A/E/C) Systems '90 Trade Show in Atlanta, Ga. beginning on Jun. 12, 1990.

BRIEF DESCRIPTION OF THE DRAWINGS

FIGS. 29A-298E graphically illustrate the results of performing the steps of FIG. 17 for moving right, according to the present invention.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

The preferred embodiment of the present invention may be implemented on a computer program which runs on a standard personal computer such as an Apple® Macintosh® system. This system will only be briefly described because it is well known to those having skill in the art. Similarly, the present invention utilizes, in part, many standard graphics techniques for defining polyhedra and for generating a graphics display. These techniques are described in detail in the Foley et al. textbook mentioned above, and will not be described in detail herein. Rather, the present description will concentrate on the containment and connection means and steps of the present invention.

Similarly, hardware and software techniques for using pointing devices to control the position of a cursor or other reference point on a computer screen are well known and will not be described in detail here. Rather, the description will concentrate on the technique for using a pointing device in conjunction with two selection means to provide six degrees of freedom in moving through a representation of the three-dimensional space in a user friendly and user intuitive manner.

The present invention may be implemented efficiently in a personal computer using object oriented programming techniques. Object oriented programming is well known to those having skill in the art and will only be described briefly herein. A complete description of an object oriented computer program which embodies the present invention will be described in detail. Specific examples will also be used to describe the invention, where needed.

System Environment

The present invention was designed to efficiently render a three-dimensional space and allow observer movement therethrough in real time using a low cost personal computer. Although the present invention may also be used to enhance three-dimensional rendering and simulated movement in a high speed workstation, mainframe computer, supercomputer, or any graphics system, it was first designed to provide these real time functions in the personal computer environment.

The invention may be used on any Apple® Macintosh® computer that has at least two megabytes of memory. Although it is preferred to use a color display, a black and white display may also be used. The invention may also be used on any other personal computer having a two-dimensional pointing device such as a mouse, joystick, trackball or keyboard.

Figure 1:
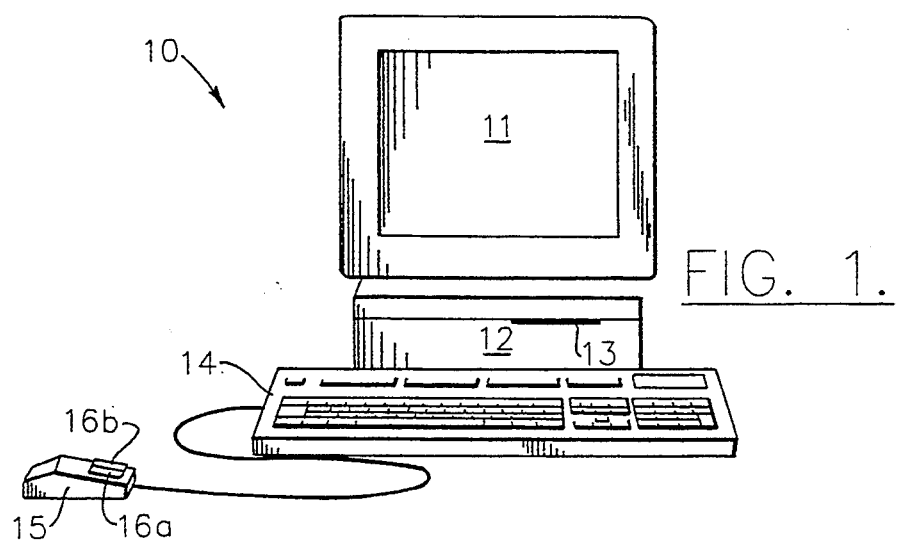
FIG. 1 illustrates a computer system on which the present invention may be practiced.

Referring to FIG. 1, the computer system 10 includes a display 11, preferably a high resolution color graphics display, and a central processing unit 12. The central processing unit contains a microprocessor (not shown) and random access memory (not shown) for storing programs therein for processing by the microprocessor. A disk drive 13 for loading programs may also be provided. A keyboard 14 having a plurality of keys thereon is connected to the central processing unit 12, and a pointing device such as a mouse 15 is also connected to the central processing unit 12. As shown, mouse 15 includes a pair of selection keys 16a, 16b which may be used in conjunction with moving an observer through a simulated three-dimensional space, as will be described below. It will be understood by those having skill in the art that many forms of pointing devices are used in data processing systems. Henceforth, any reference to mouse 15 will be understood to refer to any pointing device.

Three-Dimensional Space Representation-General Overview

A general overview of the computer-based representation of three-dimensional space according to the present invention will now be provided. The three-dimensional space representation represents all three-dimensional objects as combinations of convex polyhedra on a computer graphics system. As is well known to those having skill in the art, a convex polyhedron is a three-dimensional structure which is completely bounded by a plurality of flat surfaces, such that any two points inside the polyhedra may be connected by a line which does not cross any of the surfaces of the polyhedron. Typical examples of convex polyhedra are a cube, cylinder and pyramid.

Once a plurality of three-dimensional polyhedra are defined, the connections therebetween are also specified. A connection is a logical construct which relates a surface on one polyhedron to the surface of another polyhedron. In one implementation, connection may only be maintained among polyhedra surfaces that lie in a single plane. However, the planes do not have to be in the same physical space, with overlapping and congruent surfaces. Since the connections are logical connections, any polyhedron can be connected to any polyhedron regardless of their physical connection to one another. The renderer, upon finding the logical connection, will start rendering the model based on the connection. This property allows portals between volumes that do not necessarily map into the same space. For example, several large rooms that would normally conflict in space could be connected to a surface of a small lobby to allow easier, quicker navigation between the large spaces.

The three-dimensional space also includes a "reference" which is also referred to as an "observer" or "viewer" and which is defined as the point of view or camera position from which the image will be rendered. As will be described below, the present invention allows the reference to be moved along six degrees of freedom using a two-dimensional pointing device and two selection keys.

According to the invention, the "containment" relationships among the plurality of convex polyhedra in the three-dimensional space are used to efficiently produce three-dimensional space rendering in real time. Since all of the three-dimensional shapes have been defined as convex polyhedra, the present invention recognizes that convex polyhedra have both an interior and an exterior. Therefore, polyhedra can contain other polyhedra. If the containing polyhedron is completely opaque, the contents of the polyhedron are not visible from a reference outside the polyhedron. Accordingly, those internal objects to the polyhedron do not have to be considered when attempting to draw a scene from a position outside the polyhedron. Conversely, if the observer is contained within an opaque polyhedron, there is no need to consider objects which are outside the polyhedron. Three-dimensional rendering is thereby greatly simplified because the position of every three-dimensional object need not be recalculated each time the reference changes.

One exception to the above rule concerning containment occurs when a polyhedron includes a hole in the surface thereof. The hole in the polyhedron allows the contents of the polyhedron to be visible, but only within the limited range of this hole. Thus, the image of an interior polyhedron needs to overlap the image of the hole in order for the interior polyhedron to be considered when rendering from the outside.

According to the invention, holes may be defined between logically connected surfaces of two polyhedra. The hole provides visible access between the interiors of the polyhedra without having to conduct lengthy search operations to determine if the polyhedron is visible, and also to find other polyhedra which are not in fact visible but whose image overlaps the hole. Since the surfaces of the polyhedra are logically connected, the hole need only be defined in one surface and can be "inherited" by the other connected surfaces. Thus, the issue of resolving facing holes is easily solved.

The containment and connection relationships described above may be maintained in a three-dimensional graphics processing system by maintaining two logical structures. The first logical structure is a tree structure where the nodes are all polyhedra and the branches of the tree are those polyhedra which are contained by a node polyhedron. As is well known to those having skill in the art, a tree structure may be defined as a hierarchical structure consisting of nodes connected by branches, in which each branch connects one node to a directly subsidiary node; there is a unique node called the root which is not subsidiary to any other node; and every node besides the root is directly subsidiary to exactly one other node. See the IEEE Standard Dictionary of Electrical and Electronics Terms, Fourth Edition, 1988. An example of a three-dimensional space and the containment tree therefor is provided in FIGS. 2 and 3, respectively.

Figure 2:
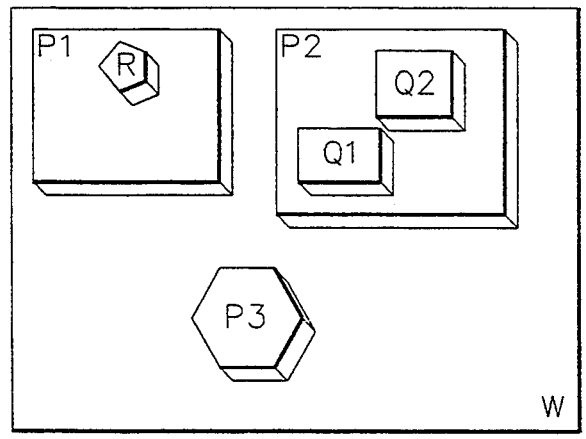
FIG. 2 is a graphical illustration of a three-dimensional space, according to the present invention.

As shown in FIG. 2, a plurality of polyhedra P1, P2, P3, Q1, Q2 and R are all contained within a particular world polyhedron W. The world polyhedron W is the container of every polyhedron in a three-dimensional space. In other words, all polyhedra contained within the three-dimensional space are contained within the world polyhedron. As shown in FIG. 2, polyhedron R is contained within polyhedron P1, polyhedra Q1 and Q2 are contained within polyhedron P2 and polyhedra P1, P2, and P3 are contained within the world W.

Figure 3:
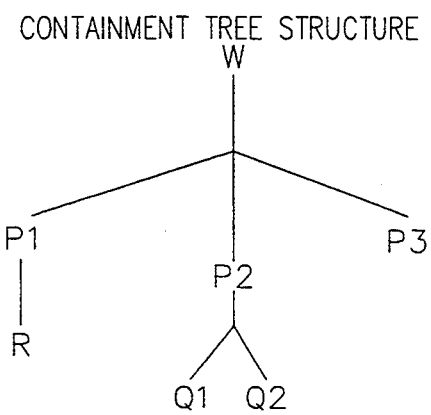
FIG. 3 illustrates a containment tree structure for graphically representing FIG. 2, according to the present invention.

The containment tree structure for the three-dimensional space of FIG. 2 is shown in FIG. 3. This tree structure logically describes the relationship described above in words. By using the containment tree, the rendering operation is greatly simplified. For example, if the observer is inside P1, the only possible polyhedron which needs be rendered is R, and P2, Q2 and P3 may all be disregarded. Similarly, if the observer is in P2, only Q1 and Q2 need be rendered and P1, R and P3 may be disregarded. High speed, real time rendering is thereby provided.

Figure 4:
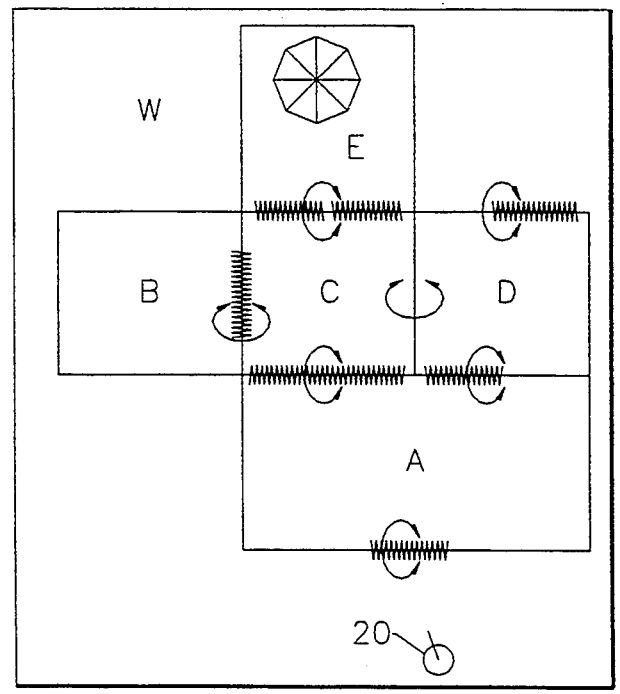
FIG. 4 illustrates a graphical representation of a plurality of three-dimensional rooms, according to the present invention.

The second logical structure is a bidirectional graph which specifies the connection relationships among the polyhedron surfaces. As is well known to those having skill in the art, a graph may be defined as a model consisting of a finite set of nodes having connections called edges or arcs. See the IEEE Standard Dictionary of Electrical and Electronics Terms, Fourth Edition, 1988. This graph allows the renderer to quickly determine what is on the other side of the hole in a polyhedron. If there is a connection, then the hole is analogous to a door leading into a second polyhedron. Since the pointer is bidirectional, looking back from the second polyhedron through the same hole allows the renderer to see into the first polyhedron. FIG. 4 illustrates a plan view of a plurality of three-dimensional rooms or rectangular solids A, B, C, D and E, with a pyramidal solid contained in room E. The outside word is shown as W. Thick lines indicate holes, with circular arrows indicating bidirectionality. The reference or observer is shown as 20.

Figure 5:
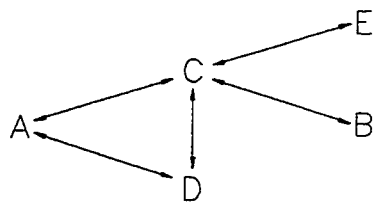
FIG. 5 illustrates a bidirectional connection graph structure for the representation of FIG. 4, according to the present invention.

FIG. 5 illustrates the bidirectional graph which specifies the connections among the polyhedra surfaces of FIG. 4. As shown in FIG. 5, polyhedra A and C are connected, polyhedra A and D are connected, polyhedra C and D are connected, polyhedra C and E are connected and polyhedra C and B are connected.

Figure 6:
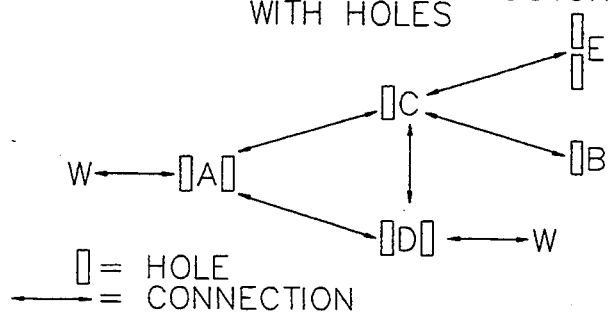
FIG. 6 illustrates a bidirectional connection graph structure for the representation of FIG. 4, including holes, according to the present invention.

The connection graph structure of FIG. 5 may be enhanced by adding the holes which connect the various connected surfaces. Such a connection graph structure with holes is shown in FIG. 6. Referring to FIG. 6, the connection graph structure with holes for the three-dimensional space of FIG. 4 is shown. As shown, polyhedron A is connected to the outside world and to polyhedra C and D with holes. Polyhedron C is connected to polyhedron A with a hole and to polyhedra B and D with holes. Two holes are shown connecting polyhedra C and E. A single hole connects polyhedra C and B, and a single hole connects polyhedra C and D. Polyhedron D is also connected to the outside world by a hole.

An example of the use of the connection graph of FIG. 6 to render the three-dimensional space of FIG. 4 will now be described. A detailed object oriented programming implementation will then be described.

Figure 7:
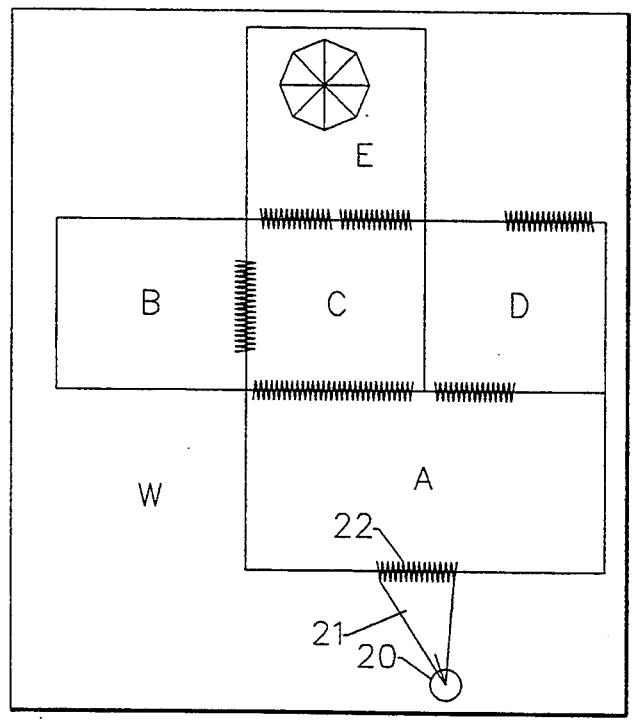
FIG. 7 illustrates a step in rendering the representation of FIG. 4, according to the present invention.

Referring to FIG. 7, it is assumed that the observer is in the outside world W within which polyhedra A–E are contained. The position of the observer is shown in FIG. 7 at 20, using a circle to indicate position and a radial line through the circle to indicate the pointing direction of the observer.

Figure 8:
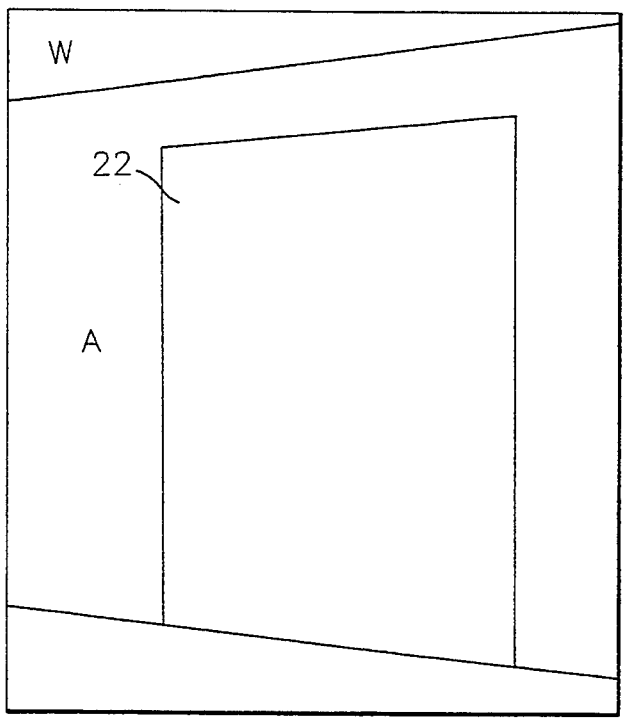
FIG. 8 illustrates the rendering corresponding to FIG. 7, according to the present invention.

As shown in FIG. 7, assume that the observer is outside room A in the location shown. First, the room closest to the observer (A) is found and is rendered. During the rendering operation a hole 22 in the surface in front of the observer is found. The hole 22 is clipped to the current clipping area 21 which then becomes the clipping region. The clipping operation is a well known graphics operation which allows a graphics system to draw a line or polygon on the graphics screen, such that only the part of the object that is being drawn that overlaps the clipping object is actually drawn. Accordingly, the hole 22 in the front surface is clipped to the current clipping area 21 which then becomes the clipping region. See FIG. 8. The inside surfaces of room A are then drawn, clipped to the current clipping region.

When each of these interior surfaces is drawn, a search is performed for holes in the surface using the connection graph structure with holes of FIG. 6. If there is a hole, a check is made to see if the hole connects to another polyhedron at that surface. If it does not, then the hole connects back to the outside world W and the exterior space is drawn from this position. The hole is then clipped to the current clipping region. If the result is a nil region, this indicates that the hole is not visible from the observer's point of view.

Figure 9:
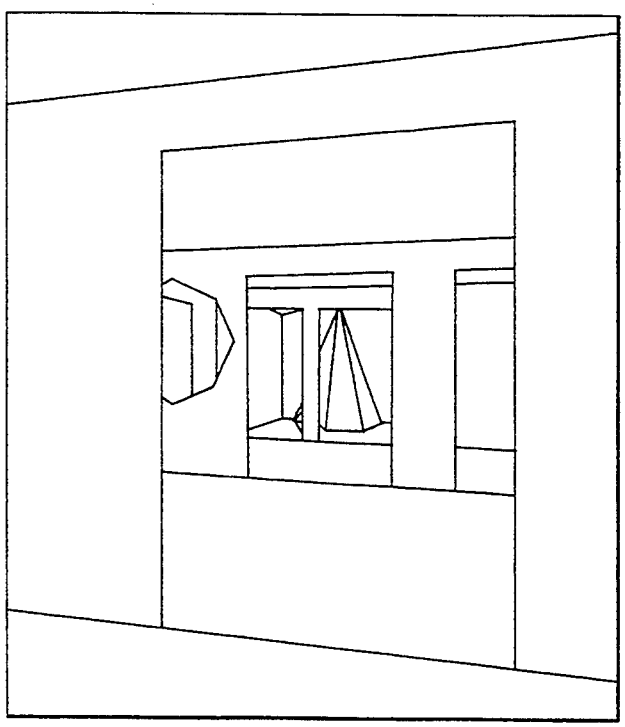
FIG. 9 illustrates a complete rendering of the representation of FIG. 4, according to the present invention.

After moving through all of the holes in the surface, a check is made to see if there are any connections. If there are, then a check is made to see if there are any holes in the surfaces to which the connections are linked, and these holes are dealt with as described above. The completed rendered surface is shown in FIG. 9.

As described above, the use of a containment tree and a connection graph with holes allows a representation of the three-dimensional space to be efficiently rendered in real time. Based upon the description already provided, this rendering system can be implemented on any computer graphics system by one having skill in the art, using conventional programming techniques or special purpose hardware. However, for purposes of describing the best mode contemplated by the inventors for carrying out the invention, an object oriented programming description will now be provided.

Object Oriented Programming Overview

As described above, the present invention was first implemented by the present inventors in a program product marketed under the trademark Virtus Walk-Through TM by Virtus Corporation, the assignee of the present invention. This program product was implemented in object oriented programming language. An overview of object oriented programming will first be described followed by a complete description of the object oriented programming implementation of the present invention.

Object oriented programming is a computer programming technique which provides reusable and easily expandable programs. In contrast with known functional programming techniques, which are not easily adaptable to new functional requirements and new types of data, object oriented programs are reusable and expandable as new requirements arise.

In an object oriented programming system, the primary focus is on data, rather than functions. Object oriented programming systems are composed of a large number of "objects". An object is a data structure and a set of operations or functions that can access that data structure. Each operation (function) that can access the data structure is called a "method". Each defined object will usually be manifested in a number of "instances". Each instance contains the particular data structure for a particular example of the object.

Object oriented programming systems provide two primary characteristics which allow flexible and reusable programs to be developed. These characteristics are referred to as "encapsulation" and "inheritance". The data of an object is encapsulated by its methods (functions). A wall of code has been placed around each piece of data. All access to the data is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data for functions. Each subclass "inherits" the frame and methods of its superclass.

In an object oriented system, a high level routine requests an object to perform one of its methods by sending the objects a "message" telling the object what to do. The receiving object responds to the message by choosing the message that implements the method name, executing this method, and then returning control to the calling high level routine along with the results of the method. A more detailed description of the design and operation of an object oriented program is provided in the textbook entitled "Object Oriented Software Construction" by Bertrand Meyer, published by Prentice Hall in 1988, the disclosure of which is incorporated herein by reference.

Object Oriented Programming Implementation

A detailed description of an object oriented implementation of the three-dimensional rendering system of the present invention now be described. In the description, "methods" "functions", "procedures" and "actions" all refer to methods as defined above. As is well known to those having skill in the art, a description of the data and the methods that the object uses is sufficient to replicate the system. In the following description, no assumptions are made about the particular programming language for implementing the system except that it need be an object oriented language. Examples of appropriate object oriented languages are Smalltalk, Eiffel, C++, Borland Corporation's Turbo Pascal and Apple Computer Corporation's Object Pascal.

The following definitions are used to describe the data. There are equivalent analogues in all object oriented programming languages if they are simple type, otherwise, they are defined in terms of the simple types, i.e. as collections of simple type information:

boolean—a value that represents only TRUE or FALSE. It can have no other value associated with it.

integer—a whole number where the range is determined by the computer system running the program. Typical ranges are −32,000 to 32,000.

double—a high precision natural number which has the ability to represent both very large numbers and fractional values.

Point—a compound type number which includes a double representing the x-coordinate value and a double representing the y-coordinate value.

Point3D—a compound type which is made up of three doubles representing the x, y and z coordinate values.

*x—a star in front of a data type means that the object specified is not the actual data, but the address of this data which is likely someplace else in memory. This allows objects to refer to other objects without having to contain the entire contents of the other object. That is, this object knows where that other object is in memory, so if it needs information from that other object, it knows where to find it.

Array—this is a compound type that is an ordered collection of the same type objects. This type can be of any length, defined as necessary. When an Array is specified, the type of the objects that make up the array are also specified. Thus, "integer Array x" represents a pointer to an Array of integers.

The above definitions are used before the name of the data that is being described to define the type of that data. Thus "integer x" means that the data referred to by x is of the integer type.

In the description which follows, methods are described by first specifying their return values, followed by the name of the method, followed by a list of arguments, or values that are passed to the method in parentheses. The arguments are also specified as to their type. If there is no return value, or no arguments, the word "void" is used to specify this fact. Examples of methods are:

integer methodName(integer firstArg, integer Array ,secondArg)

void anotherMethod(void).

A general description of the Objects will now be provided, followed by a detailed description of each object and its methods:

Clip—The implementation of the Clip object type is well known to those having skill in the art of object oriented graphics programming. The preferred embodiment uses a polygonal clipping object, (not necessarily rectangular) such as that described in section 19.1 of the above mentioned Foley et al. textbook (pages 924–945), the disclosure of which is hereby incorporated herein by reference, or a Macintosh clipping region as described in the publication Inside Macintosh, published by Apple Computer Corporation, pages I-135-I-162 and I-181-I-187, Volume 1, chapter 6, the disclosure of which is hereby incorporated herein by reference. The Clip object allows the system to draw a line or polygon on the computer display such that only the part of the object being drawn that overlaps the clipping object is actually drawn.

Polyhedron—As already described, three-dimensional spaces are described in terms of polyhedra. The polyhedron object type has methods that are used to construct the polyhedra, manipulate and transform them, render them, and ultimately to destroy them. It includes containment information about associated polyhedra such as the polyhedron that contains this polyhedron and a list of all the polyhedra that this one contains, the data that defines the polyhedron and is used to actually create it, and the actual 3D polyhedron data such as the list of point3D and the surfaces that use these points, and that are used to render the polyhedron.

Surface—This object type defines a surface of a polyhedron. It contains an array of indices into the polyhedron's list of points that define the outline of the surface. It also includes surface feature information. Surface features are holes in the surfaces. Thus a door or window is defined as a surface feature of a wall. A Surface object can have any number of surface features. In addition to the surface feature, the surface includes the polyhedron connection information. A surface may be connected to any number of polyhedra.

Feature—This object type is simply a list of point3D that define a hole in the surface of a polyhedron.

Camera—This object type specifies both the position and the orientation in which to move the object. Typically, this represents the position and orientation of the camera (or observer). The standard method is to presume that the camera is fixed in space and at the center of the world. Thus, the objects are rotated around it by first translating them so that the camera is at the origin and then the objects are rotated around this origin. The resulting data is then rendered. The representation of the data is a matrix representation described in Chapter 5.6 pages 213–217 of the Foley, et al textbook.

A detailed description of the objects, and their data and methods, will now be provided.

Clip

Since the methods of clipping are well known to those skilled in the graphics art, a detailed implementation need not be described. Two unique methods used by the present invention will be described.

Methods

DrawClip(Point Array *polygon)

This method draws the polygon on the screen only inside the clipping region. It draws the intersection of the polygon and the clipping region. Note that the region itself is (usually) a polygon.

Clip * MakeClip(Point Array *polygon)

This method creates a new clipping region that is the intersection of the old clipping region and the polygon that is passed into it.

Camera

This object contains the 4 by 4 matrix that is described in Chapter 5.6 pages 213–217 of the Foley, et al. textbook and a single method:

Point Transform(Point3D fromPoint)

This takes a 3-D point and transforms it using the 4×4 matrix into the 2-D screen position point.

Polyhedron

The observer or reference is always inside a polyhedron. The polyhedron may in fact be the global, or world polyhedron which has no bounds, but the observer is inside it. The rendering process first determines which polyhedron the reference is in. The camera's spatial position (x,y,z coordinates) is used to find the current polyhedron, and then call that polyhedron's Draw3D method described below. In calling the Draw3D method, the following arguments, are provided: the ClipRegion set to the entire screen (or window port), the current camera pose, and inside=-TRUE, because we are in fact inside the polyhedron we are beginning to render. Note that the world polyhedron has no surfaces. Thus in the world polyhedron, only the contents of this polyhedron are drawn.

Data

Polyhedron *container

This is the address of the polyhedron that contains this polyhedron. Containment is very specific; the container polyhedron actually spatially encloses this polyhedron. There is an ultimate container of polyhedra and this is referred to as the world. It has a value of 0 for the container.

Polyhedron Array*contents

Just as this polyhedron is contained within another polyhedron, this is the address of an array that contains pointers to all of the polyhedra that are contained within this one.

Point3D Array points

This is the array of the actual vertex points of the polyhedron.

Point Array posedPoints

This is the array of the vertex points of the polyhedron after the camera transformation has been applied. Note that the result is 2-D and is mapped to the screen or window port, using known techniques.

Surface Array surfaces

These surface objects contain an ordered list of indices into the point array above. An ordered list is used instead of the actual point value because a point is typically shared by more than one surface. If this point needs to be spatially transformed, it need only be transformed once, and each surface has access to the new point. Otherwise, it would need to be transformed multiple times for each surface.

Methods

Polyhedron*InsidePolyhedron(Point3D position)

This method returns the smallest polyhedron that the position point is inside. It comprises the following steps:
- Determine if the position is inside this polyhedron.
- If not, return NIL.
- If inside, for each contained polyhedron call it's InsidePolyhedron method until a non-NIL value is returned.
- If non-NIL is returned, return that value.
- Else, return a pointer to THIS polyhedron. This pointer means that we are inside of this polyhedron, but outside of the contents of this polyhedron.
- Draw3D(Clip *clipRegion,Camera *newPose, boolean inside) This method comprises the following steps:
- Call the Calc3D method below to reorient this polyhedron to the observer's position.
- Call the surface's Calc3D method for each surface which reorients each surface's surface vector.
- Call the DrawSurface method for each surface to draw that surface, including the surface features.
- Sort the contents of the polyhedron by distance.
- Call Draw3D for each of the content polyhedra, starting with the furthest, until the closest is obtained.

Calc3D(Camera *newPose)

This method is used to reorient the object to the camera's orientation. For each point, transform the point by the method described in Chapter 5.6 pages 213–217 of the Foley, et al. textbook. Place the resulting point into the corresponding position in the posedPoints array.

Surface

Data

Polyhedron *owner

This is a pointer to the owning polyhedron. This gives the surface object access to the polyhedron's posedPoints array and to the container polyhedron.

integer Array index

This is a list of indices that apply both to the points array and the posedPoints array. It is the ordered indices of the vertices of this surface. Note that this list is always defined such that the direction is clockwise from the outside.

Point3D normal

This is the surface normal to the surface. It is a point defined to be a unit distance from the origin which represents the vector that is perpendicular to each point on the surface. It's length is unimportant, as long as it is non-zero and oriented in the outside direction (out of the polyhedron).

Feature Array surfaceFeatures

This is an array of surface features, which are defined to be ordered lists of 3-D points that represent holes in the surface object.

Polyhedron Array connected

Surface Array connectedSurface

This is an array of all of the polyhedra that are connected to this surface and the surfaces to which they are connected. This is analogous to two rooms being next to each other and sharing a wall. This connection is bidirectional. Thus, if a polyhedron is listed in this surface's connected array, then that polyhedron's surface has this polyhedron listed in its connection array. This allows two polyhedra to share surface features such as doors.

Methods

Calc3D (Camera *newPose)

Applies the new camera orientation to the surface normal vector. If we assume that the camera is positioned along the z-axis, this results in a positive or negative value for the z component, depending on which side of the surface we are on. If we are on the same side, this value is positive. If we are on the opposite side, this value is negative.

DrawSurface(Clip *region, boolean inside)

Clip *region is a pointer to the 2-D clipping region. We only draw inside this region. Boolean inside is a flag that indicates whether we are drawing this polygon from the inside or not.
- If we are drawing from the inside (inside is TRUE) and the normal vector is positive, then call Drawinterior(Clip *region).
- Else, if we are drawing from the outside (inside is FALSE) and the normal vector is negative, then call DrawExterior(Clip *region)
- Else this surface is not visible and we need not draw it.

Drawinterior(Clip *region)

- Draw the surface through the clipping region by making the call to the clipping region's DrawClip method using the indexed array of points as the argument.
- For each surface feature in the surface:
  - Transform this surface feature (which is an array of 3-D points) using the camera object.
  - Create a new clip object using MakeClip and the surface feature point list as the argument. If the resulting clip object is NIL, go to next surface feature.
  - If there are any connected polyhedra to this surface, call each of the connected polyhedrons Draw3D method with the new calculated clip region, the camera position and inside=TRUE.
  - If there are no connected polyhedra to this surface, find the containing polyhedron of the owner polyhedron and make a call to the Draw3D method with the new calculated clip region, the camera position and inside=TRUE. Note that we are still INSIDE the containing polyhedron.
- For each connected polyhedron that is connected to this surface, determine the surface of the polyhedron that is connected to this one. Then, for each surface feature in the surface:
  - Transform this surface feature (which is an array of 3-D points) using the camera object.
  - Create a new clip object using MakeClip and the surface feature point list as the argument.
  - Call the connected polyhedrons Draw3D method with the new calculated clip region, the camera position and inside=TRUE.

This allows two polyhedra to share the same hole when they are connected.

Draw Exterior(Clip *region)

- Draw the surface through the clipping region by making the call to the clipping region's DrawClip method using the indexed array of points as the argument.
- For each surface feature in the surface:
  - Transform this surface feature (which is an array of 3-D points) using the camera object.
  - Create a new clip object using MakeClip and the surface feature point list as the argument.
  - Make a call to the Draw3D method of THIS polyhedron. We are now drawing the inside of this polyhedron with the new calculated clip region, the camera position and inside=TRUE.

Moving Through Three-Dimensional Space—Overview

The method and apparatus for moving the reference through the simulated three-dimensional space according to the invention will now be described. In moving through a three-dimensional space, it is desirable to allow the reference or observer to move with six degrees of freedom because this accurately represents the six degrees of freedom available to a human observer moving through a three-dimensional space. Unfortunately, it has heretofore been difficult to allow a user to move through real time three-dimensional computer generated scenes using typical computer-based data input devices. Known computer input devices include a keyboard and a number of pointing devices such as a joystick, trackball or mouse.

The keyboard does not provide a natural technique for moving through a three-dimensional space because it requires multiple keystrokes to move, or it assumes a velocity set by numeric keys and the other keys are used to change direction. Joysticks are easier to use than a keyboard, but are useful primarily for airplane simulators where six degrees of freedom is typically not necessary. The joystick typically assumes a forward velocity and the user uses the joystick to modify the direction.

There have been a number of mouse control systems used with personal computer flight simulators but these have been based upon the control system used by the joystick. Unfortunately, if the user is moving through a space, such as a building, and may even be modifying and creating the space, the inability to stop, move backwards, and in fact move in six degrees of freedom is a major hinderance.

One known technique which allows the user to stop and move backwards through a three-dimensional space is illustrated by the above described computer adventure game "The Colony". Unfortunately, this technique does not allow the user to easily move directly to the left or right, to change altitude or to change pitch or roll. In other words, motion along six degrees of freedom is not provided.

According to the invention, the pointing device is used in combination with first and second function selection means to provide six degrees of freedom through the three-dimensional space rendition. Referring again to FIG. 1, the function selection means are preferably a pair of keys 16a, 16b on mouse 15, which may be selected or held down while the mouse is moved along the X or Y axis to provide six degrees of freedom. Alternatively, a pair of keys on the keyboard 14 may be used. The keys may be used in a toggle mode in which the function is implemented until the key is depressed again, or in a hold down mode in which the key must be held down while the mouse is moved to implement the function. Other function selection keys are known to those having skill in the art.

In general, the present invention provides movement in a first plane in a three-dimensional space rendition in response to movement of the mouse. It also provides movement in a second plane in the three-dimensional space rendition in response to selection of the first key and movement of the mouse. Selection of the second key provides rotation in the three-dimensional space in conjunction with movement of the mouse.

Figure 10:
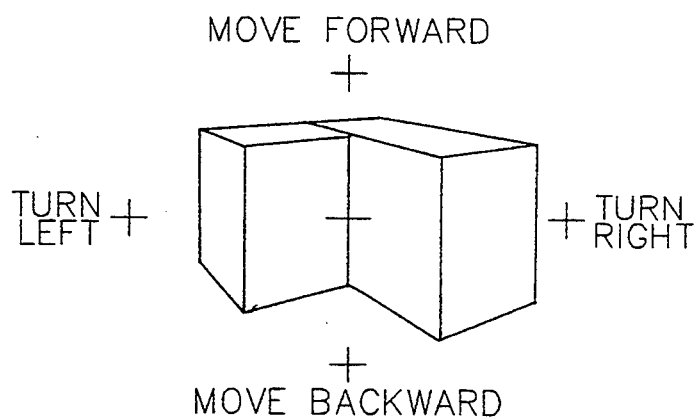
FIG. 10 illustrates of the action of the pointing device when neither function key is selected, according to the present invention.

A preferred embodiment of the present invention will now be described in which the combination of mouse movement and function selection keys have been optimized to provide user friendly movement through a three-dimensional space along six degrees of freedom. Referring now to FIG. 10, the action of the mouse when neither of the function keys are selected is shown. As shown, placement of the mouse on the vertical axis moves the reference forward or backward in the three-dimensional space. Movement to the left and right turns the user to the left and right in the three-dimensional space. In other words, yaw is changed to allow left rotation and right rotation.

Figure 11:
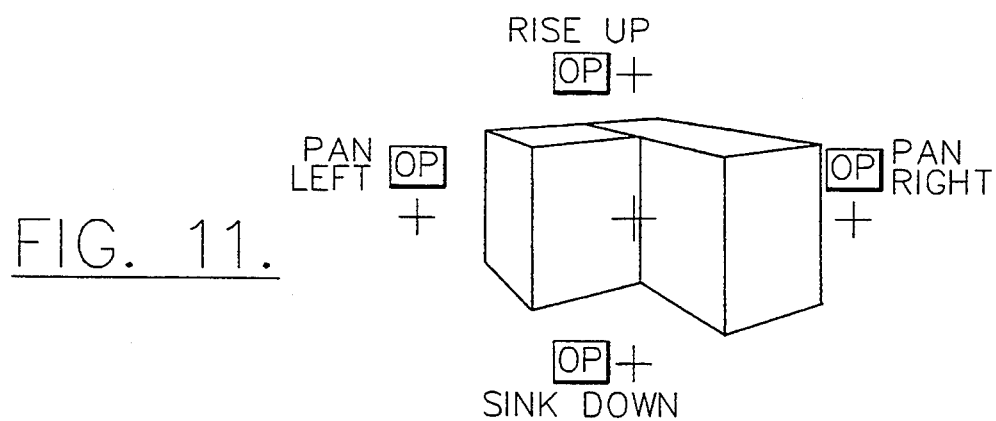
FIG. 11 illustrates the operation of the pointing device when a first function key is selected, according to the present invention.

Referring now to FIG. 11, selection of the first function selection key, here the "option" (OP) key, and movement of the mouse in the Y (vertical) direction causes the reference to rise up or sink down, i.e. to move along the Z axis of the three-dimensional space. Similarly, movement of the mouse in the horizontal direction while pressing the option key allows the reference point to move sideways in the three-dimensional space.

Figure 12:
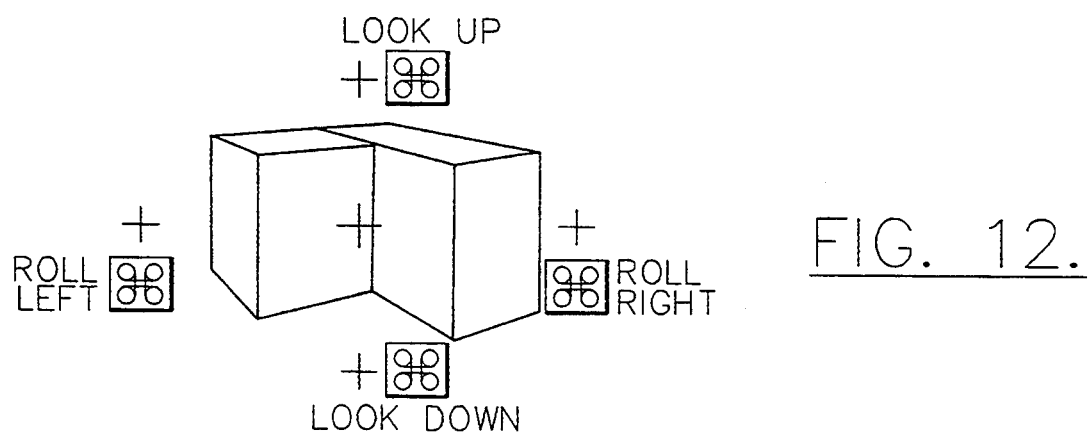
FIG. 12 illustrates the operation of the pointing device when a second function key is selected, according to the present invention.

Referring now to FIG. 12, selection of the second function key such as the "command" key (the symbol for which this is shown in FIG. 12), in combination with movement of the mouse in the vertical (Y) direction, allows the reference to look up or look down, i.e. to change pitch. Movement of the mouse in the horizontal direction (X axis) in combination with selection of the command key, allows the reference to roll to the left or roll to the right.

The above described combination of function, selection and mouse movement allows the user to easily move through a three-dimensional space.

Movement Through Three-Dimensional Space-Detailed Description

The detailed operational steps in moving the user through three-dimensional space in response to actuation of the function keys and movement of the mouse will now be described. These operational steps may be performed during the method of the Camera object which was described in detail above.

Figure 13A:
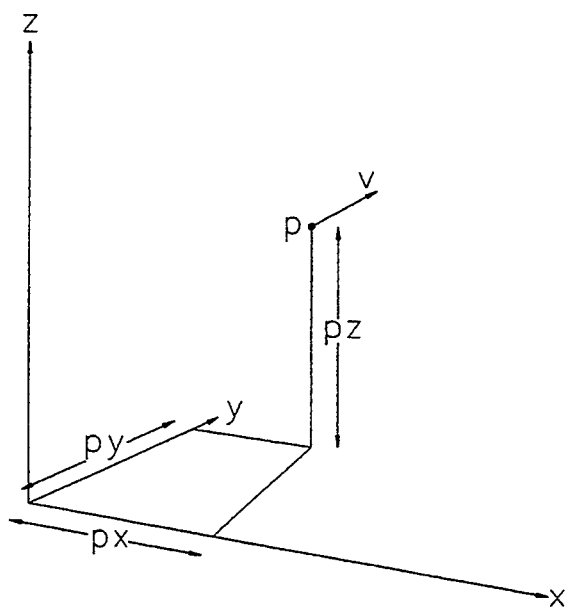
FIGS. 13A and 13B illustrate a coordinate system used a three-dimensional space, and a representation of a grid and cursor on a two-dimensional graphics display, respectively, according to the present invention.
Figure 13B:
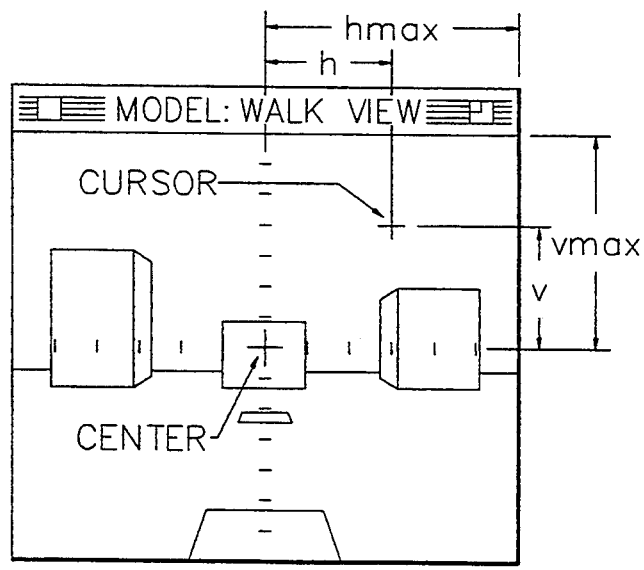

FIGS. 13A and 13B illustrate the coordinate system used for the three-dimensional space, and a representation of the grid and cursor on a two-dimensional graphics display of a three-dimensional space. As shown in FIG. 13A, p is the position point and consists of Px, Py and $p_z$. As also shown in FIG. 13A, v is the orientation vector and consists of $v_{roll}$, $v_{pitch}$, and $v_{yaw}$. The calculations described below are preferably performed on integers with integer results. Division rounds towards zero so that $5/3 = 1$ and $-5/3 = -1$. Finally, in the calculations described below, x**y means $x^y$. All of the calculations described below assume that a horizontal control reference $h_{ref}$ and a vertical control reference $v_{ref}$ are known. The horizontal control reference is defined as the maximum horizontal position divided by six ($h_{max}/6$), and the vertical control reference is defined as the maximum vertical position divided by seven ($v_{max}/7$), because there are 6 horizontal grid lines and 7 vertical grid lines from the center. In other grid spacings, other constants may be substituted.

Referring to FIGS. 14–19, the detailed operational steps for implementing the six degrees of movement according to the present invention will now be described. The sequences of operational steps are all similar. In particular, first a control value is read and a temporary value is calculated. The temporary value is tested, and a velocity value is calculated depending on whether the temporary value is less than zero, equal to zero, or greater than zero. Once the velocity value has been calculated, it is added to the existing value. Since all of the calculations involve the same overall structure, they will not be described individually.

Figure 14:
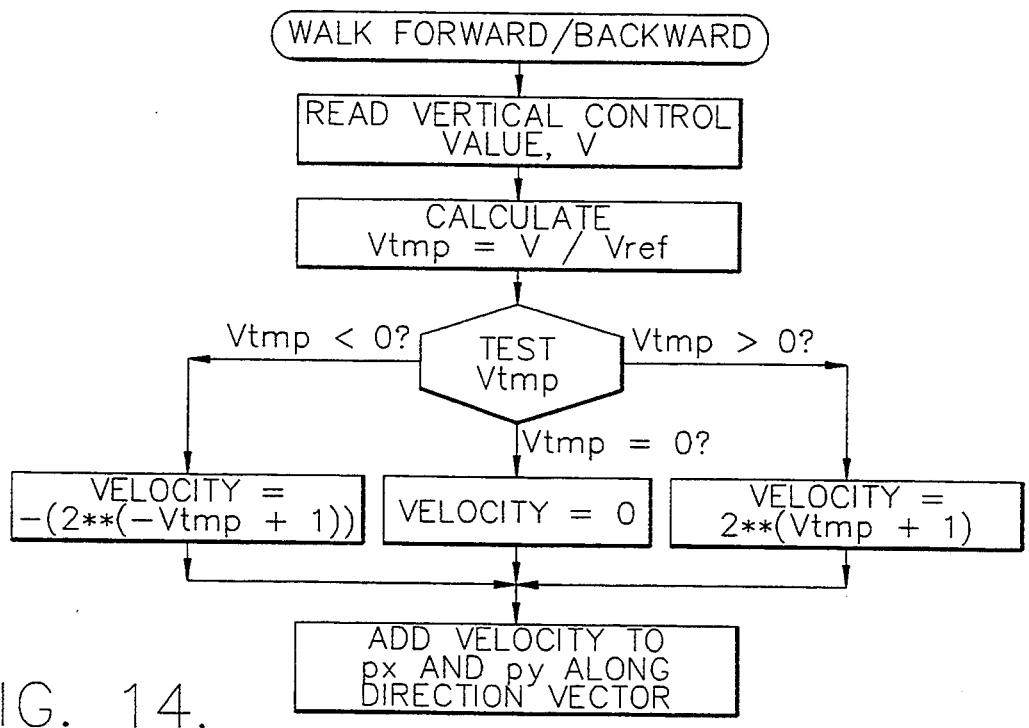
FIGS. 14–19 illustrate the operational steps for implementing six degree of freedom movement, according to the present invention.

Referring now to FIG. 14, the steps for moving the observer forward or backward through the three-dimensional space are described. These steps are performed when neither of the selection keys 16a, 16b (FIG. 1) are selected and the mouse is moved forward or backward. FIGS. 20A–20J illustrate the result of the steps of FIG. 14 on a three-dimensional space representation. FIGS. 21A–21J illustrate moving forward and backward when the mouse is placed at a faster velocity than shown in FIGS. 20A–20J. FIGS. 22A–22E illustrate moving backwards.

Figure 15:
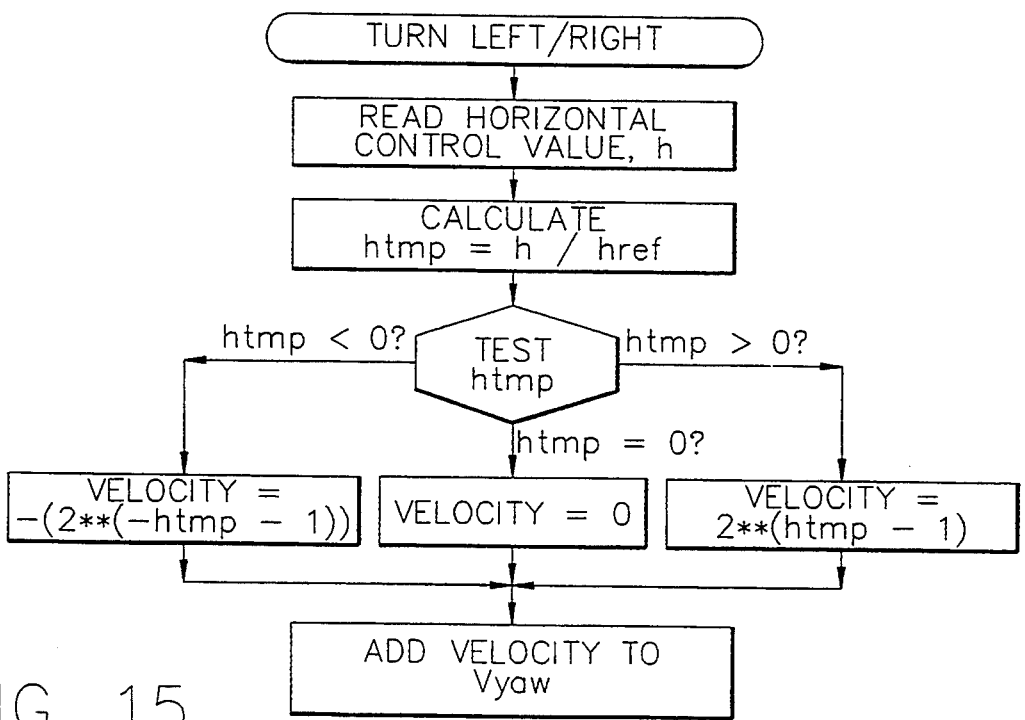

Referring to FIG. 15, the steps for turning left or right (yaw) are shown. These steps are performed in response to neither of the function keys 16a, 16b being selected, and the mouse being moved to the left or to the right. FIGS. 24A–24E illustrate the graphical results of turning to the left and FIGS. 25A–25E illustrate the graphical results of turning to the right in response to the steps of FIG. 15. FIGS. 23A–23E illustrate the combined motion of moving forward and turning right in response to the steps of FIGS. 14 and 15 which are performed upon forward and rightward movement of the mouse without selecting one of the selection keys 16a, 16b.

Figure 16:
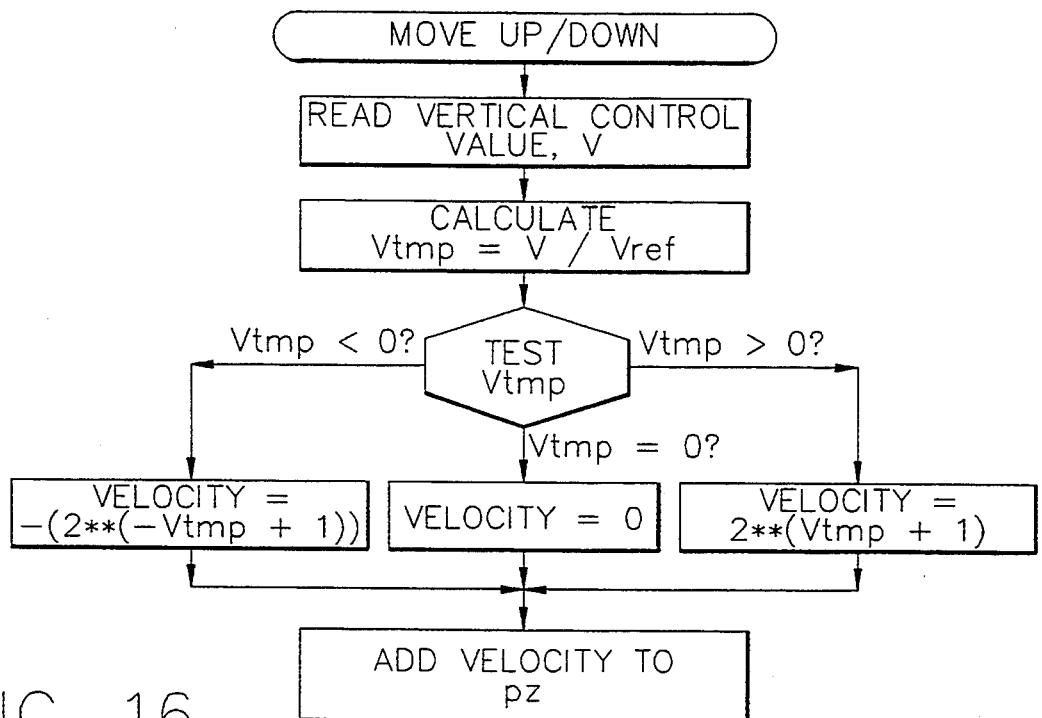

FIG. 16 illustrates the steps for moving up or down in a three-dimensional representation. These steps are performed upon selection of the first selection key 16a and movement of the mouse forward or backwards. FIGS. 26A–26E and 27A–27E illustrate the graphical results of moving up and moving down, respectively, in response to the steps of FIG. 16.

Figure 17:
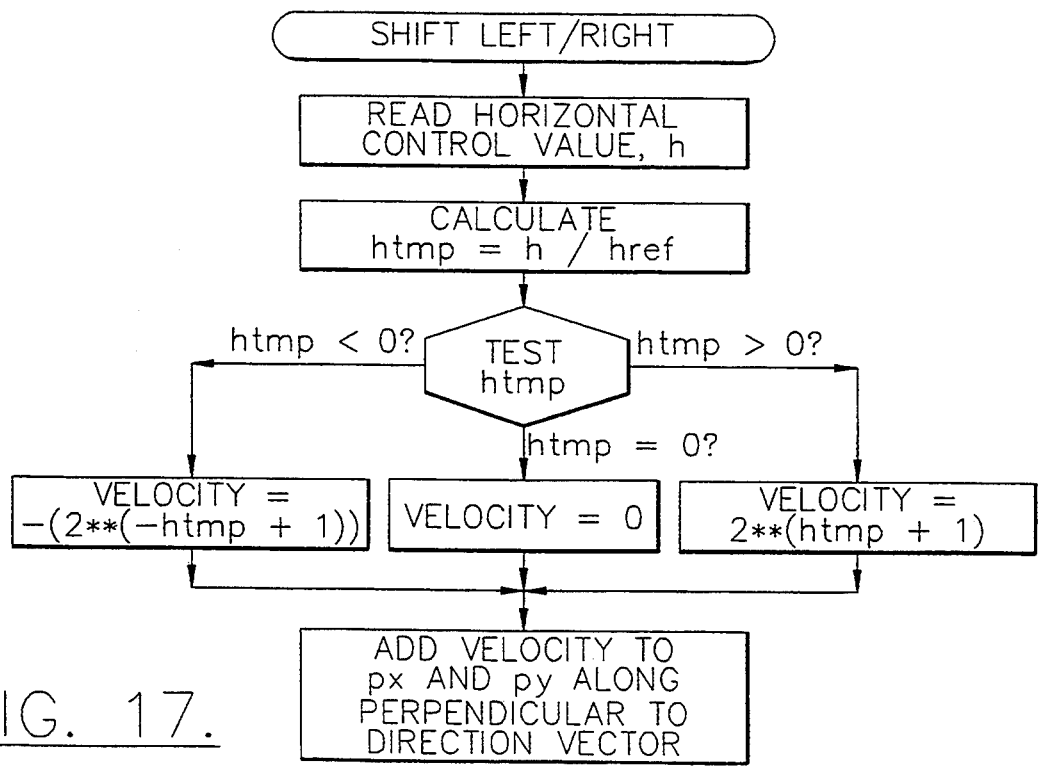

FIG. 17 illustrates the steps performed to shift left or shift right, in response to selection of the first selection key 16a and movement of the mouse to the left or the right. FIGS. 28A–28E and 29A–29E illustrate the results of these steps for moving left and moving right, respectively, in the graphical representation of the three-dimensional space.

Figure 18:
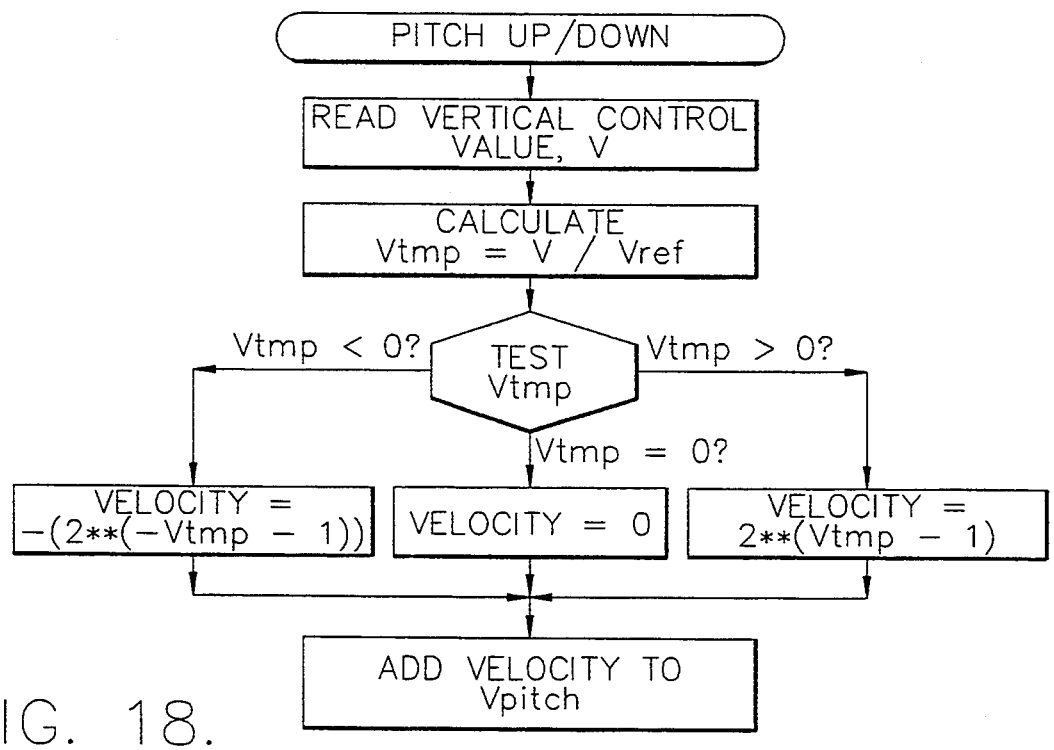

FIG. 18 illustrates the steps for increasing or decreasing pitch in response to selection of the second function selection key 16b and moving the mouse forward and backward. The results of these steps on the graphical representation of the three-dimensional space are shown in FIGS. 30A–30E and 31A–31E for increasing and decreasing pitch, respectively.

Figure 19:
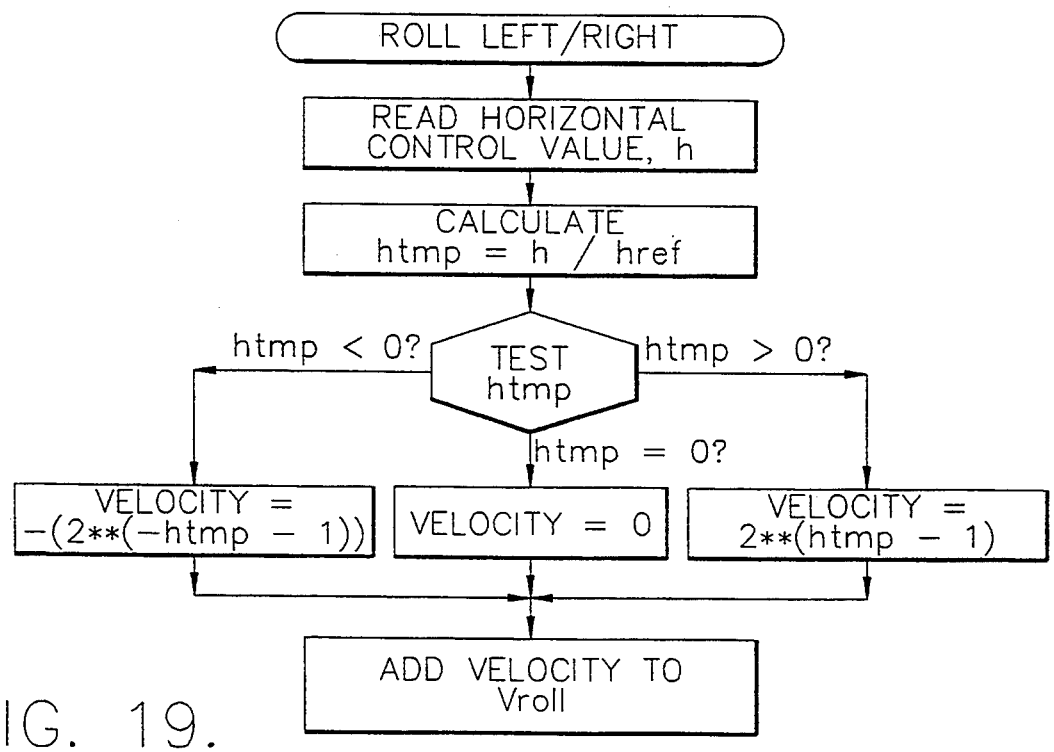
Figure 20A:
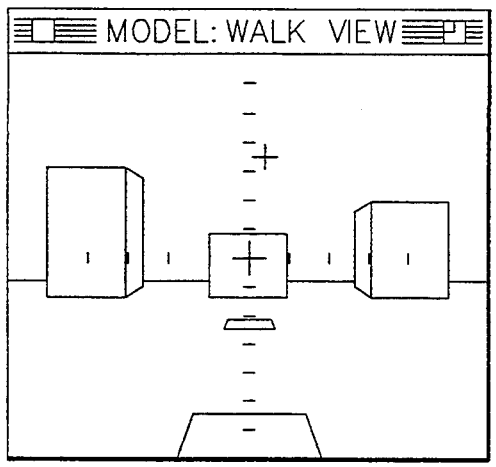
FIGS. 20A–20J graphically illustrate the results of performing the steps of FIG. 14.
Figure 20B:
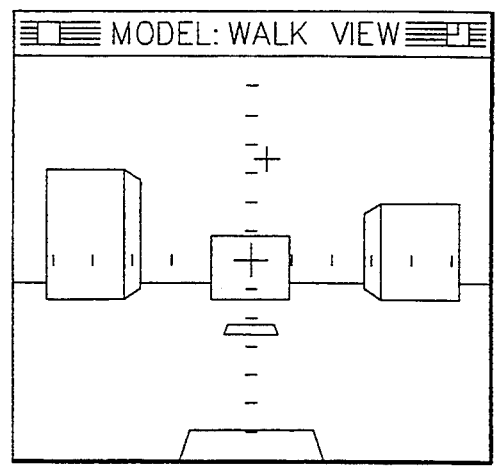
Figure 20C:
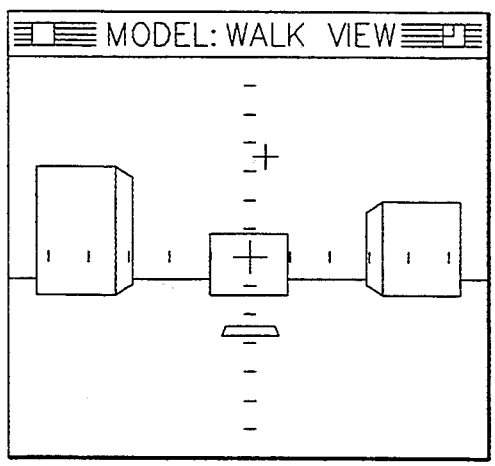
Figure 20D:
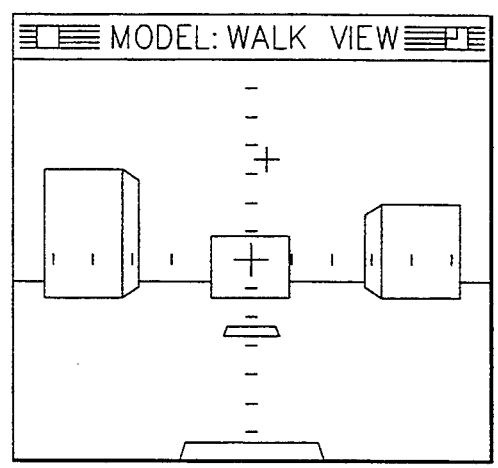
Figure 20E:
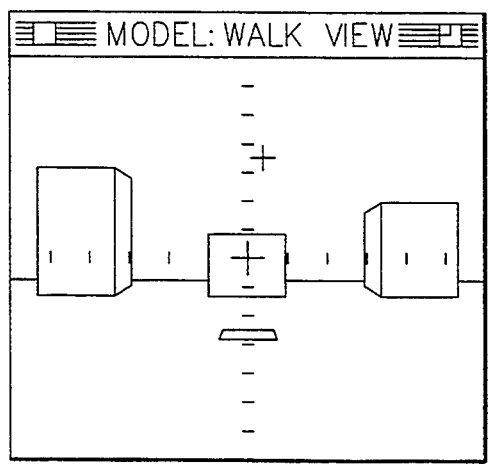
Figure 20F:
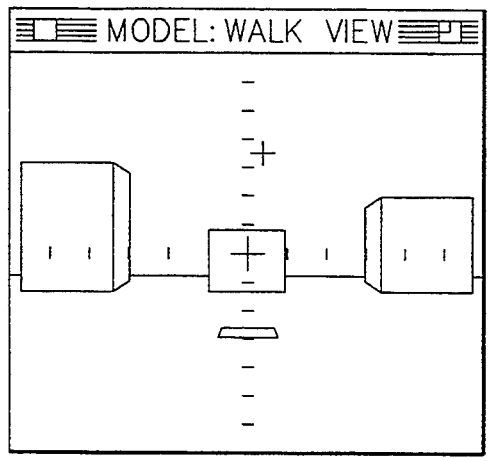
Figure 20G:
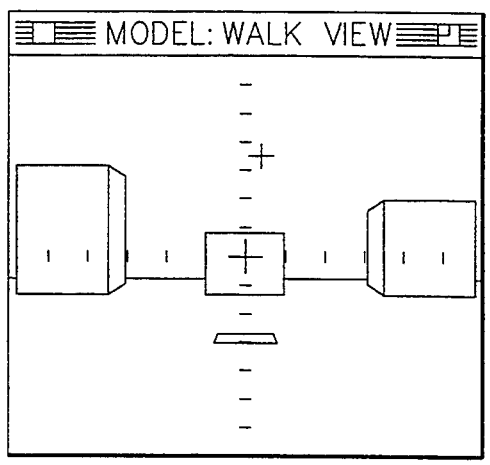
Figure 20H:
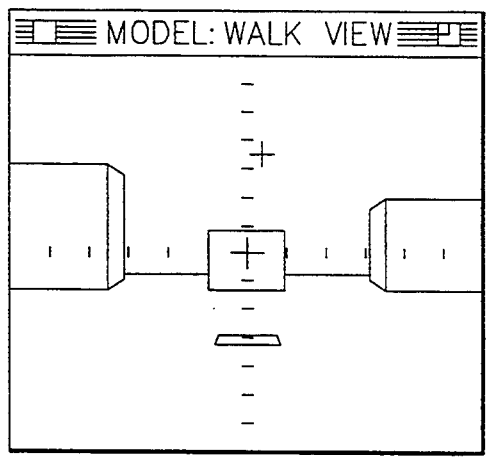
Figure 20I:
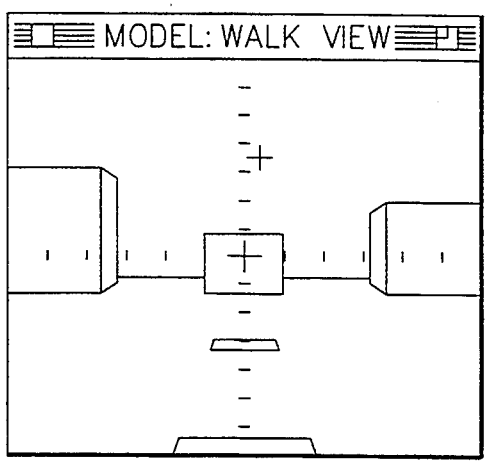
Figure 20J:
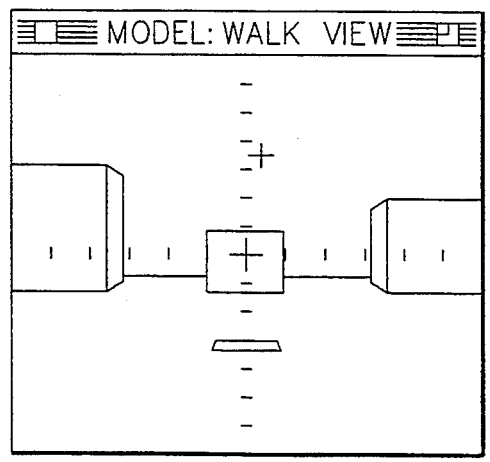
Figure 21A:
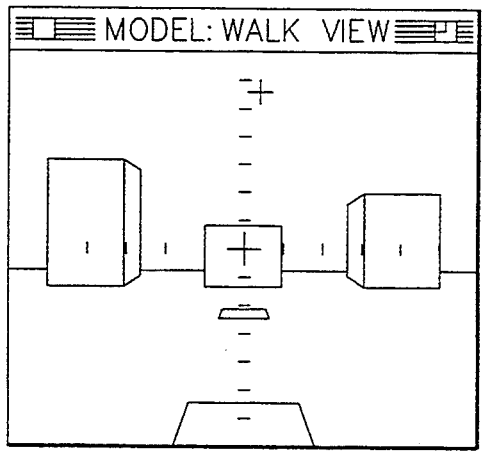
FIGS. 21A-21J graphically illustrate the result of performing the steps of FIG. 14, at a faster velocity than that shown in FIGS. 20A-20J, according to the present invention.
Figure 21B:
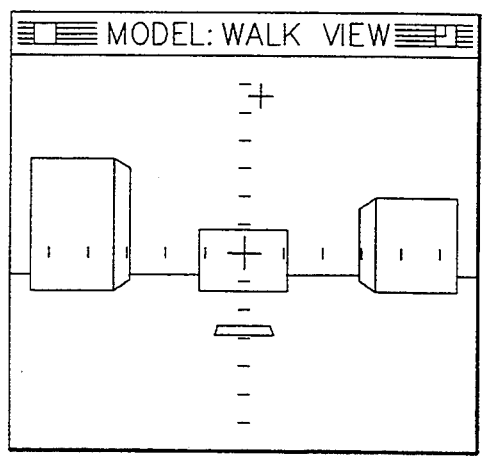
Figure 21C:
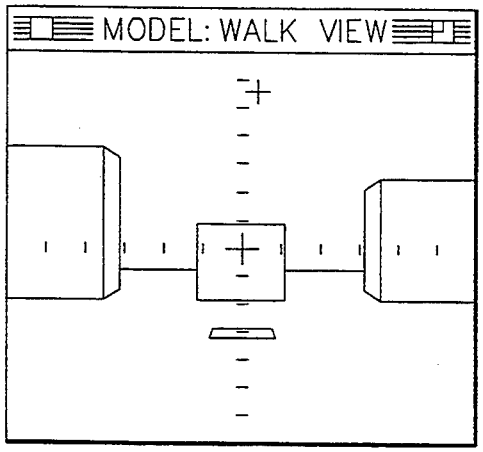
Figure 21D:
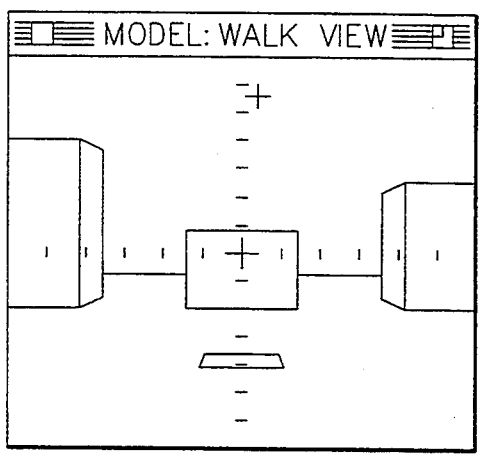
Figure 21E:
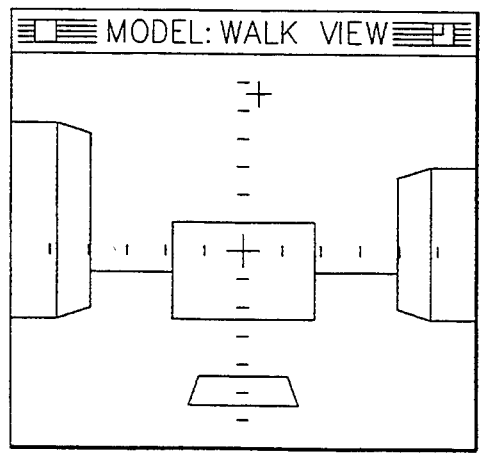
Figure 21F:
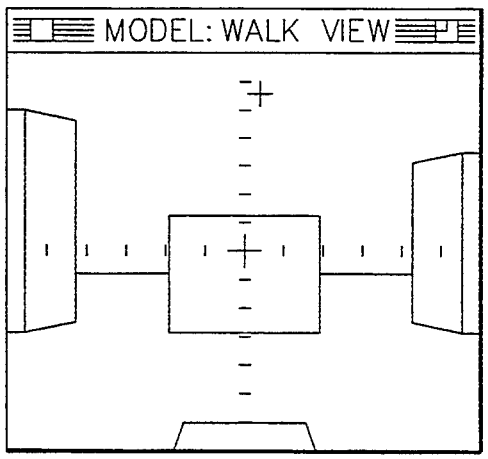
Figure 21G:
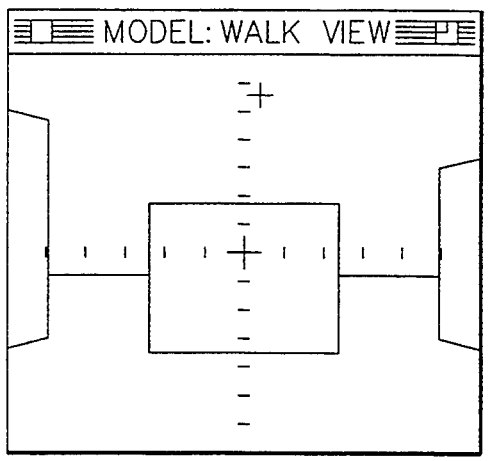
Figure 21H:
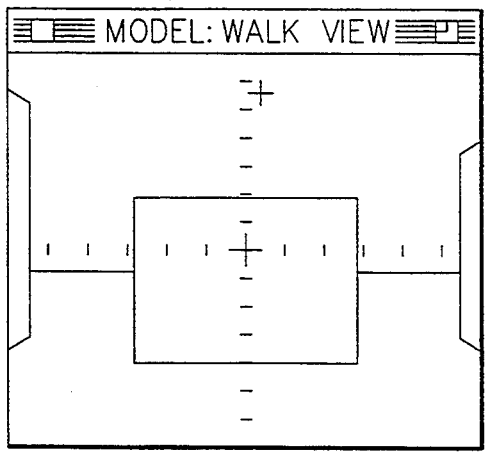
Figure 21I:
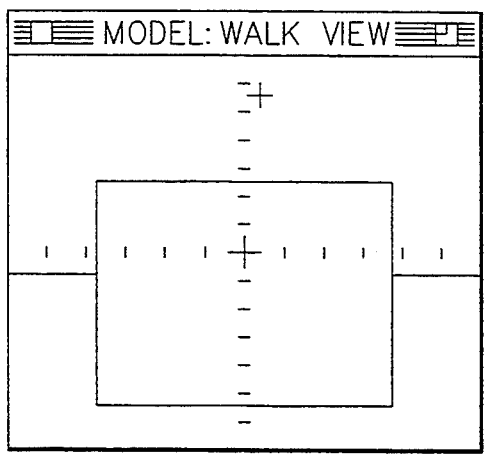
Figure 21J:
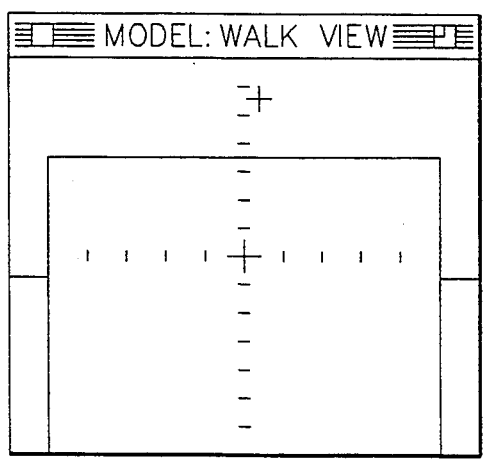
Figure 22A:
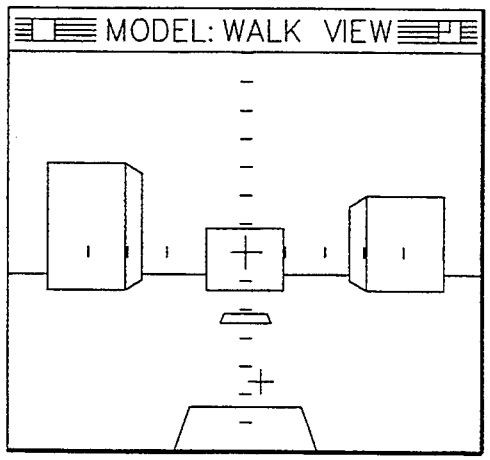
FIGS. 22A-22E graphically illustrate moving backwards upon performing the steps of FIG. 14, according to the present invention.
Figure 22B:
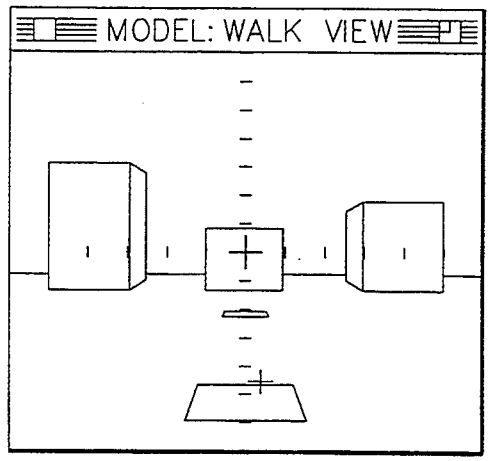
Figure 22C:
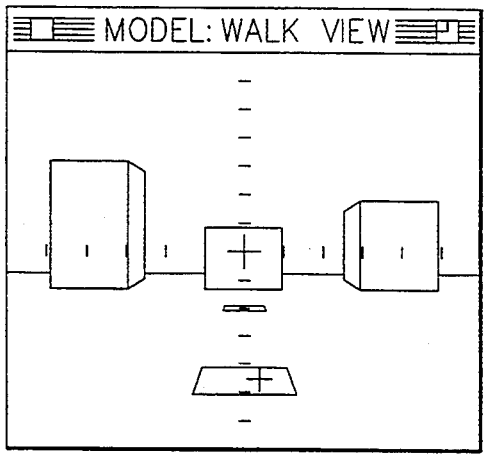
Figure 22D:
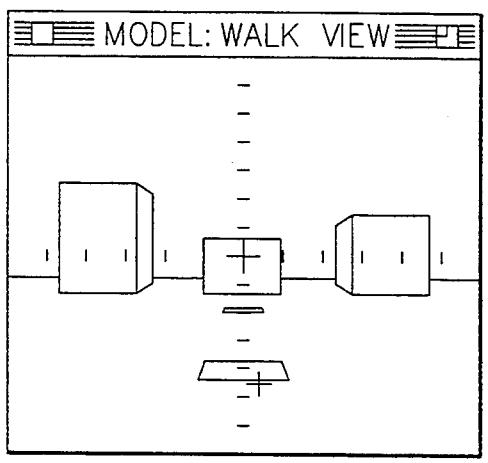
Figure 22E:
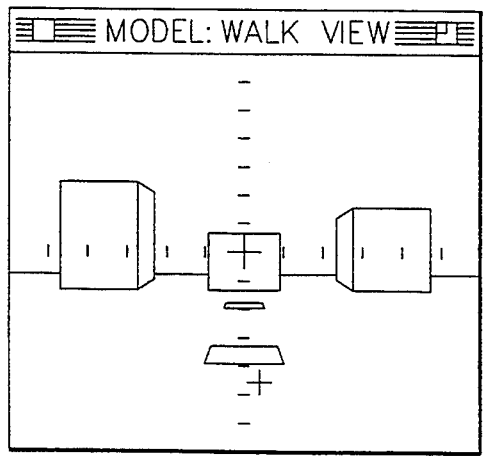
Figure 23A:
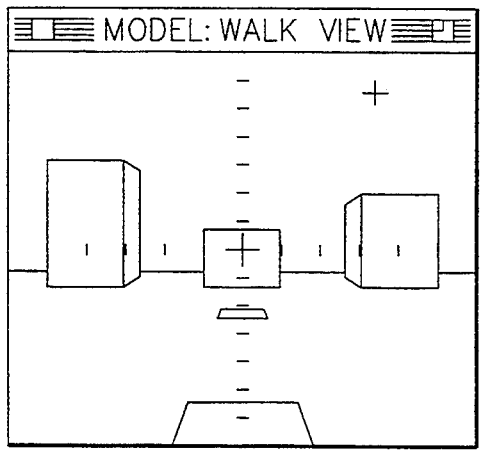
FIGS. 23A-23E illustrate the combination of moving forward and turning right in response to the steps of FIGS. 14 and 15 according to the present invention.
Figure 23B:
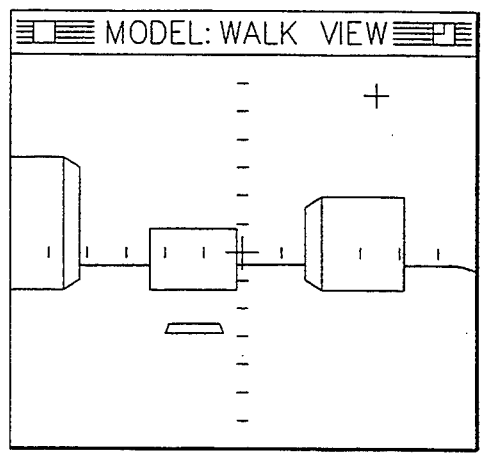
Figure 23C:
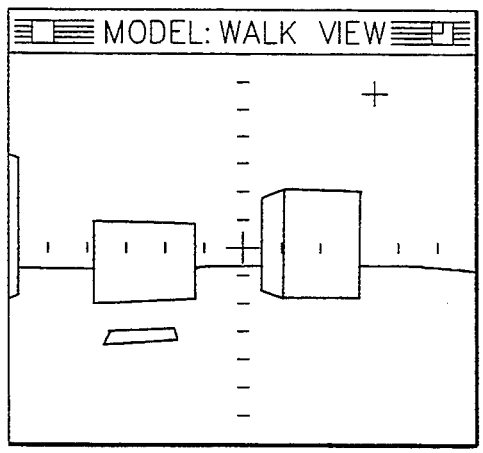
Figure 23D:
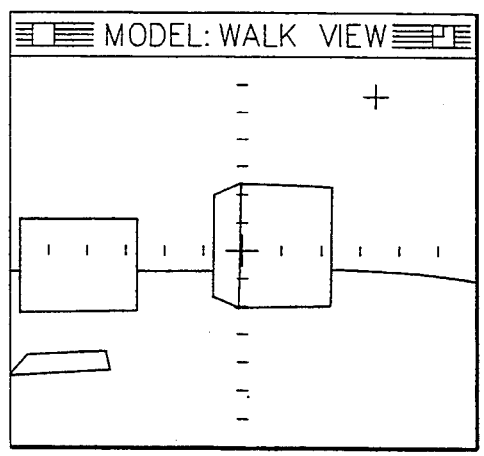
Figure 23E:
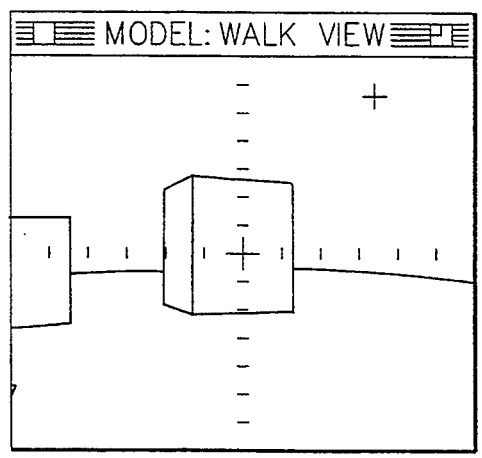
Figure 24A:
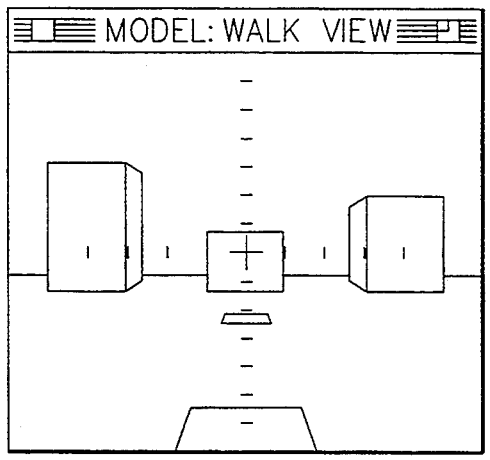
FIGS. 24A-24E graphically illustrate the results of performing the steps of FIG. 15 when turning to the left, according to the present invention.
Figure 24B:
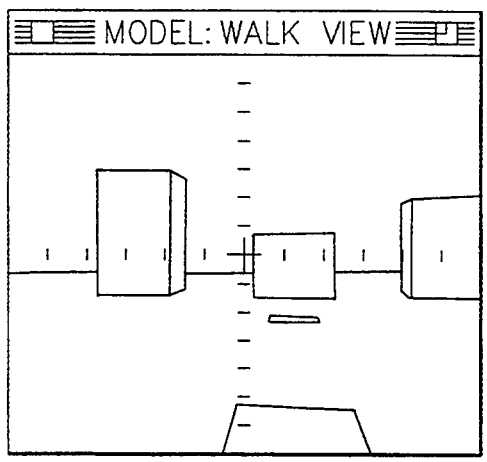
Figure 24C:
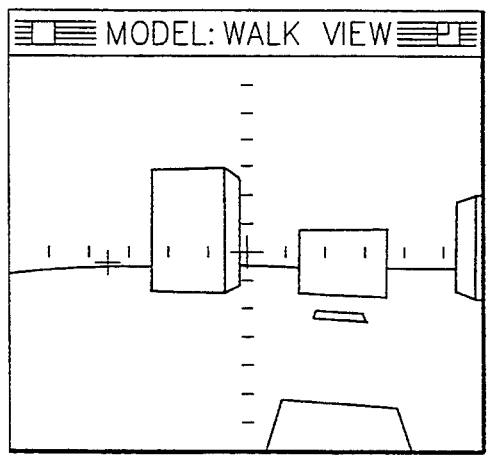
Figure 24D:
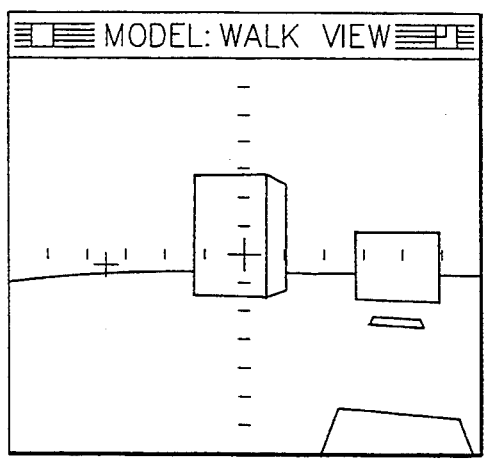
Figure 24E:
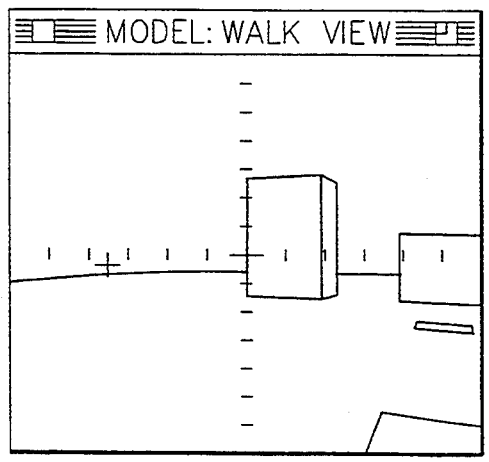
Figure 25A:
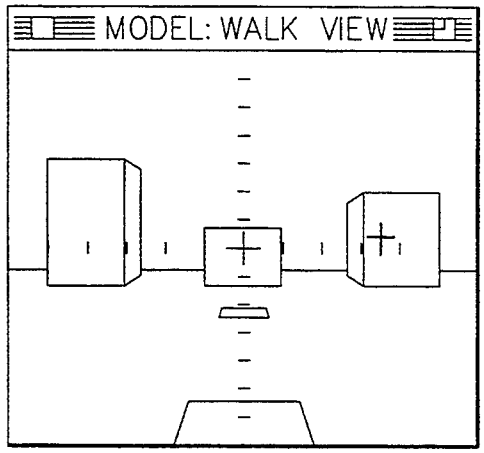
FIGS. 25A-25E graphically illustrate the results of performing the steps of FIG. 15 when turning to the right, according to the present invention.
Figure 25B:
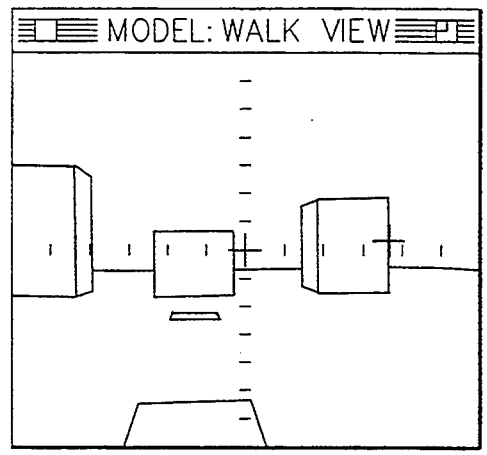
Figure 25C:
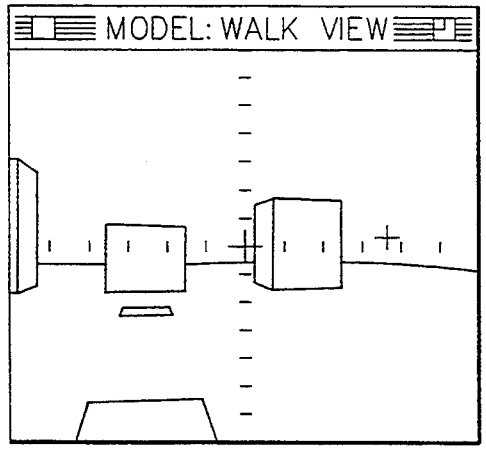
Figure 25D:
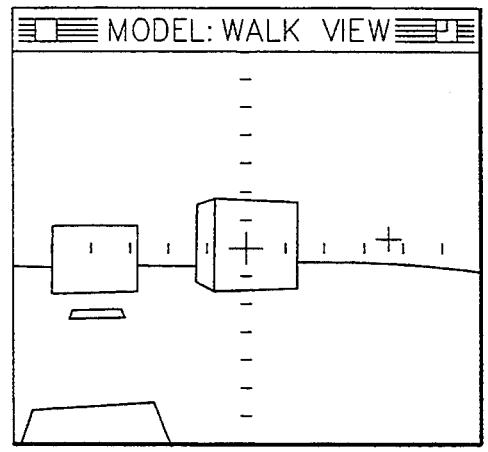
Figure 25E:
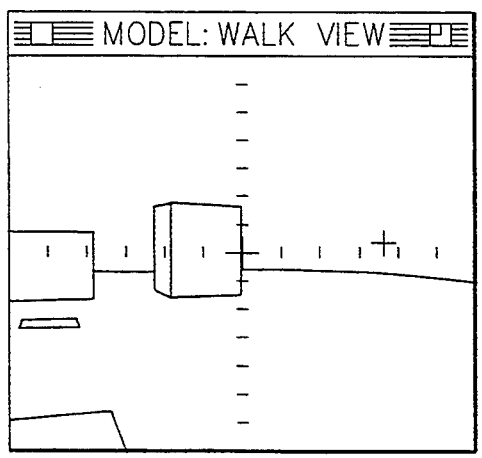
Figure 26A:
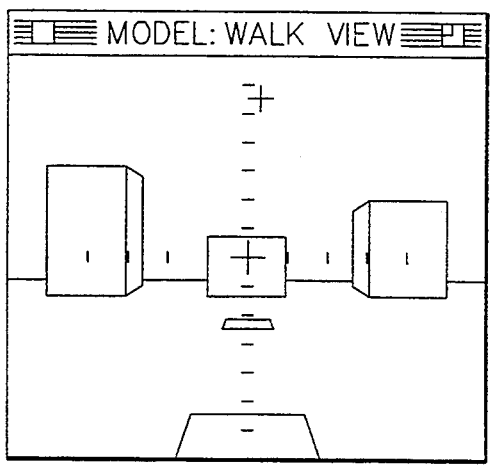
FIGS. 26A-26E graphically illustrate the results of moving up in response to performing the steps of FIG. 16, according to the present invention.
Figure 26B:
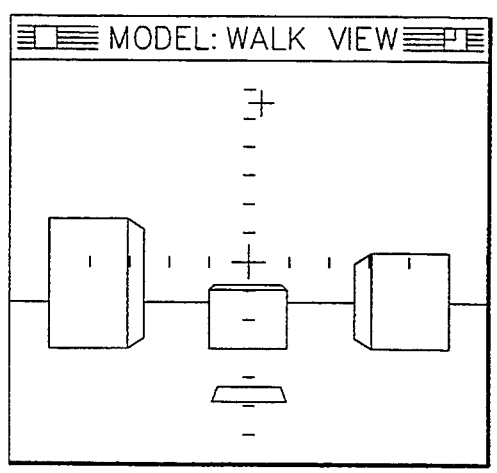
Figure 26C:
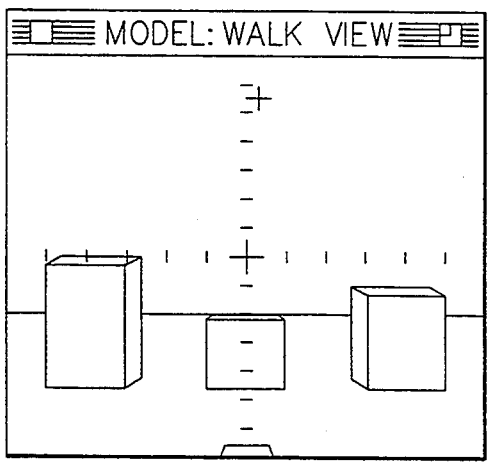
Figure 26D:
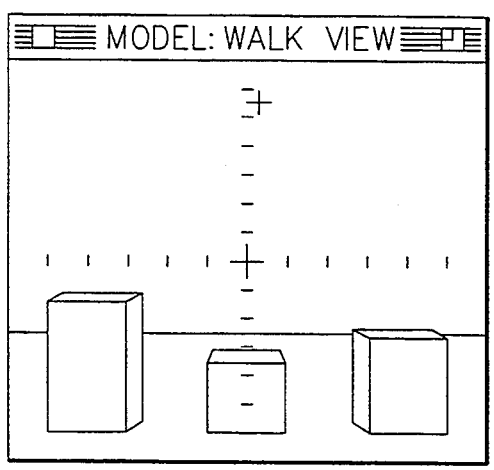
Figure 26E:
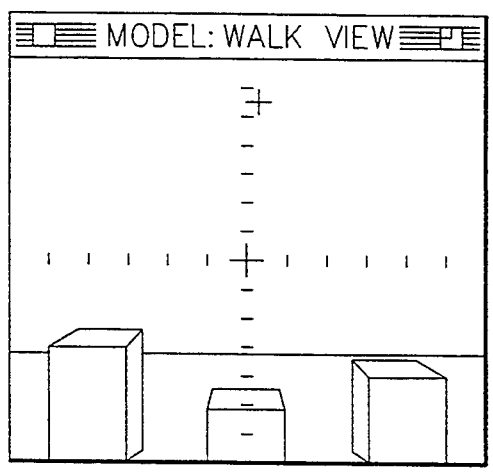
Figure 27A:
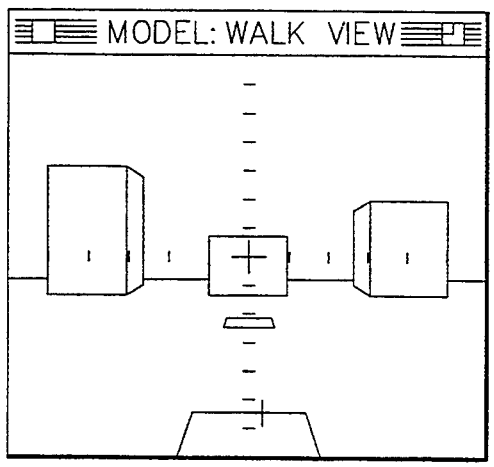
FIGS. 27A-27E graphically illustrate the results of moving down in response to performing the steps of FIG. 16, according to the present invention.
Figure 27B:
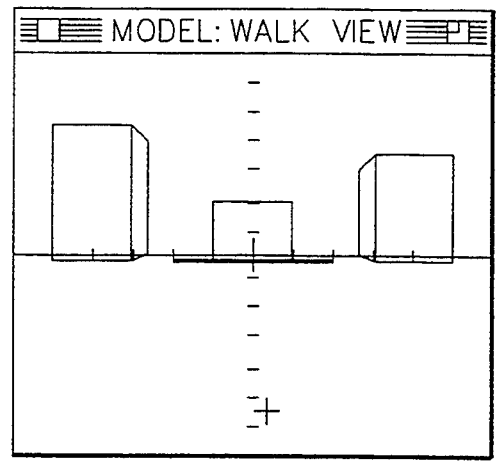
Figure 27C:
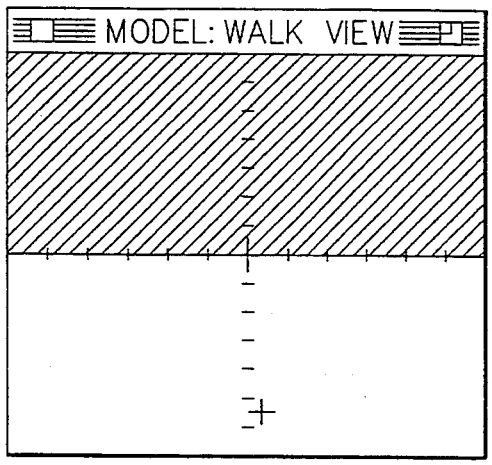
Figure 27D:
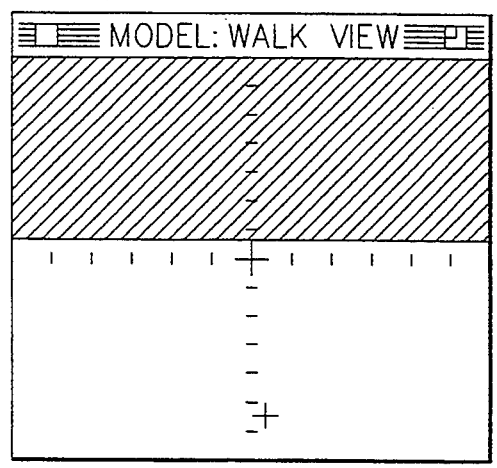
Figure 27E:
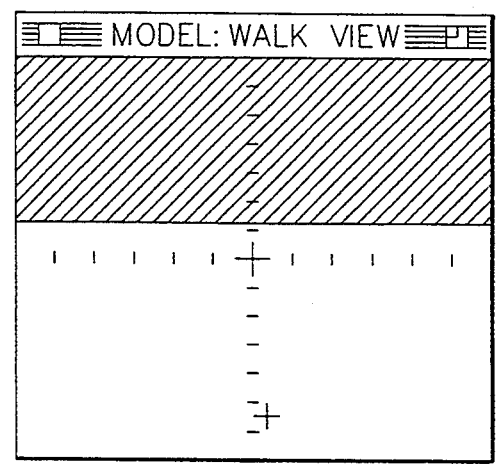
Figure 28A:
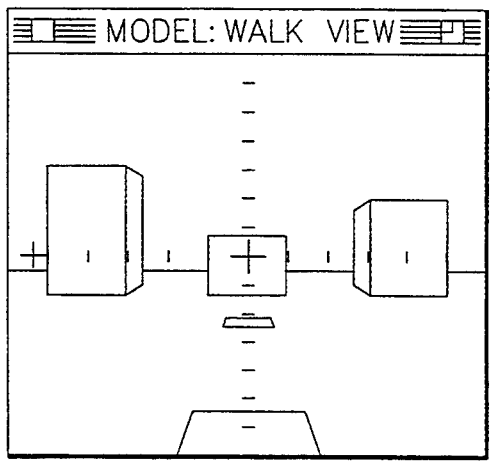
FIGS. 28A-28E graphically illustrate the results of performing the steps of FIG. 17 for moving left, according to the present invention.
Figure 28B:
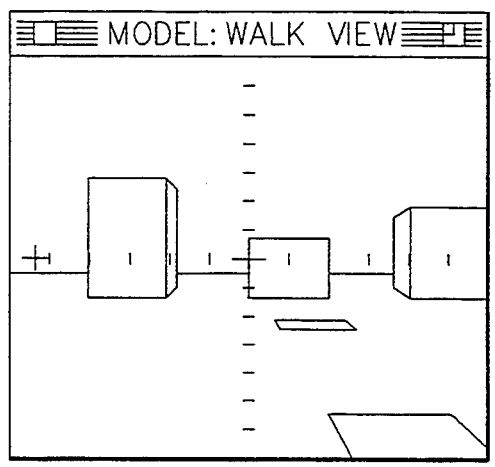
Figure 28C:
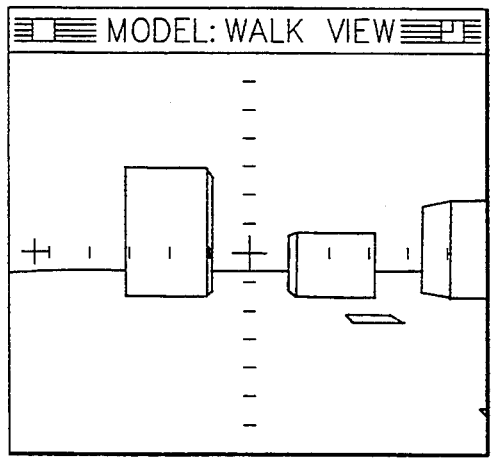
Figure 28D:
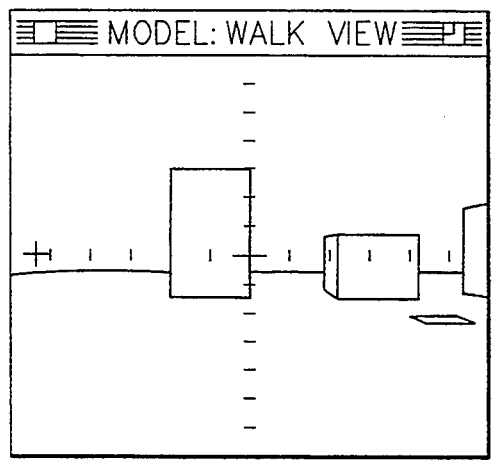
Figure 28E:
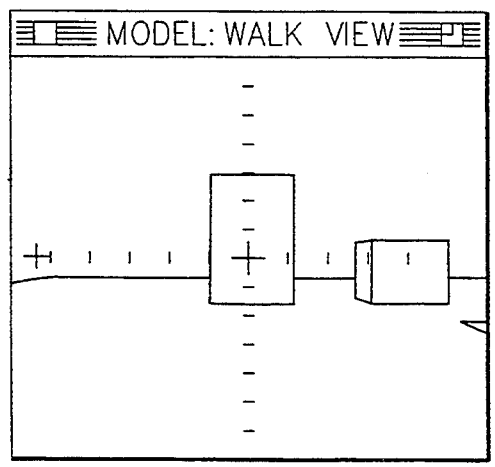
Figure 29A:
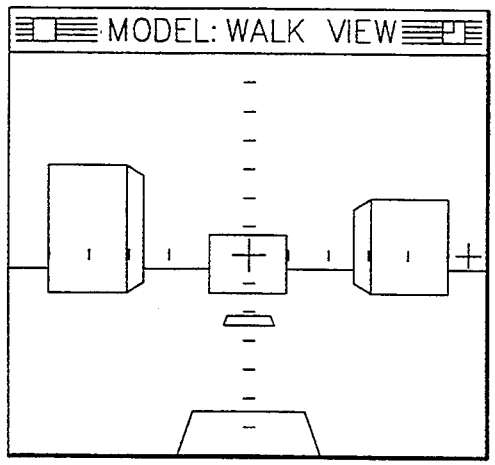
Figure 29B:
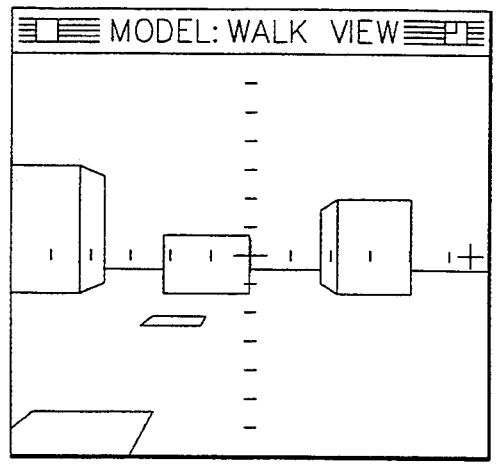
Figure 29C:
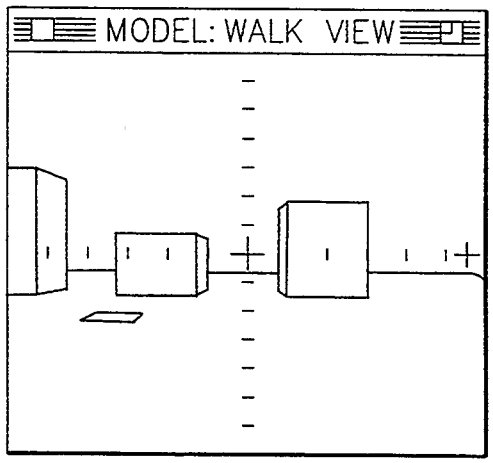
Figure 29D:
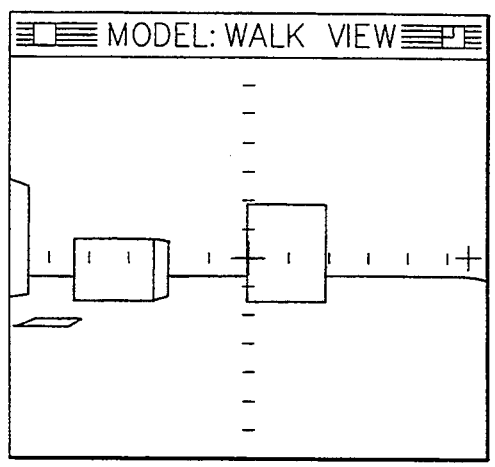
Figure 29E:
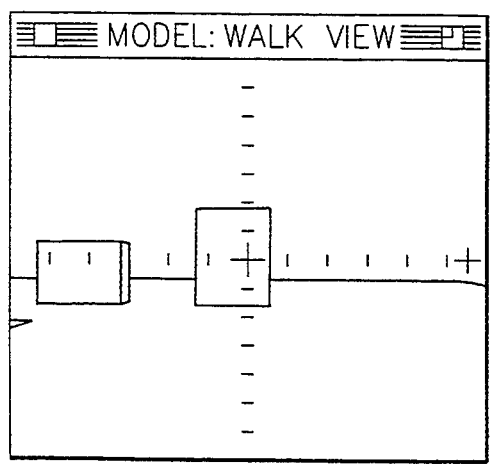
Figure 30A:
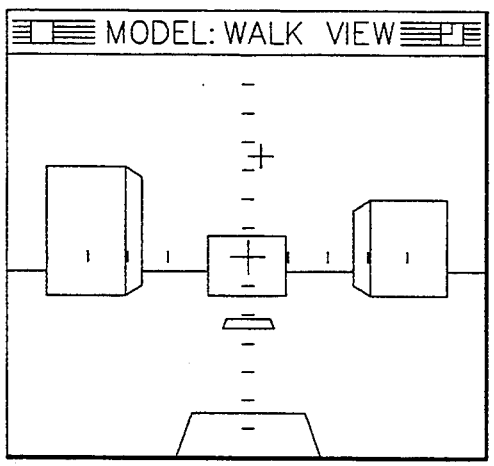
FIGS. 30A-30E graphically illustrate the results of performing the steps of FIG. 18 for increasing pitch, according to the present invention.
Figure 30B:
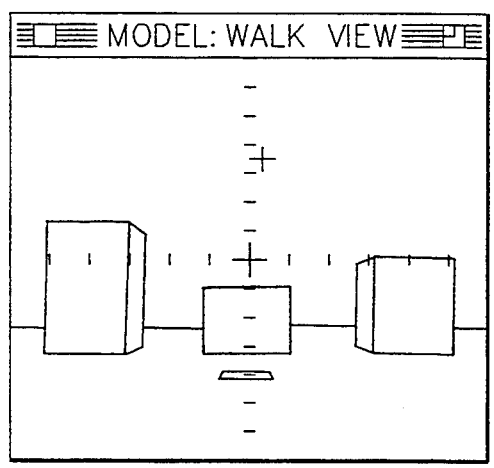
Figure 30C:
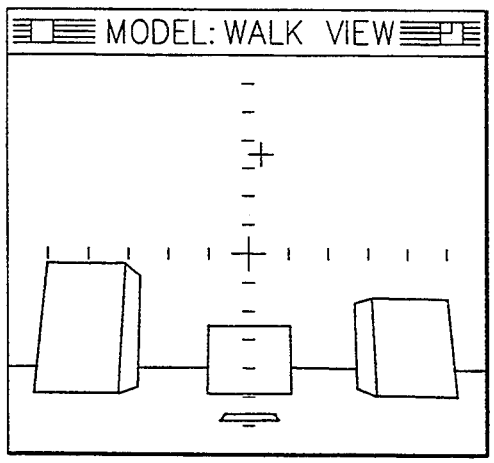
Figure 30D:
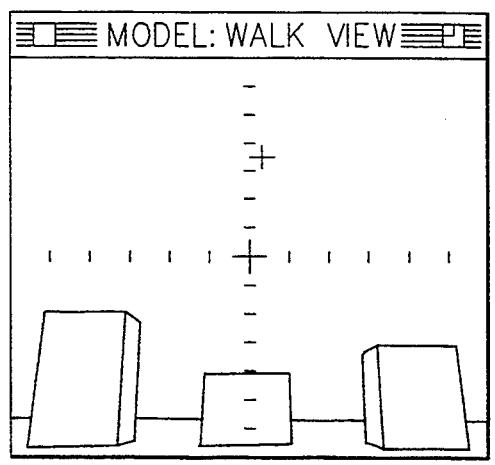
Figure 30E:
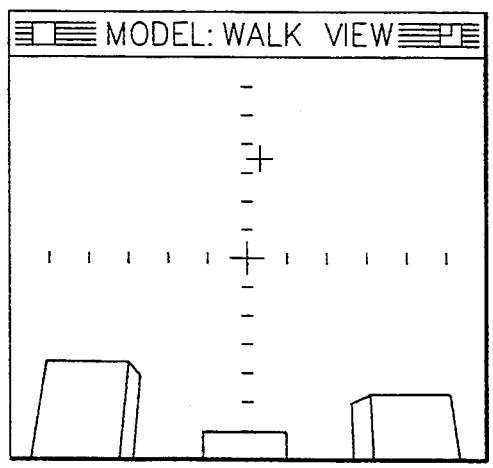
Figure 31A:
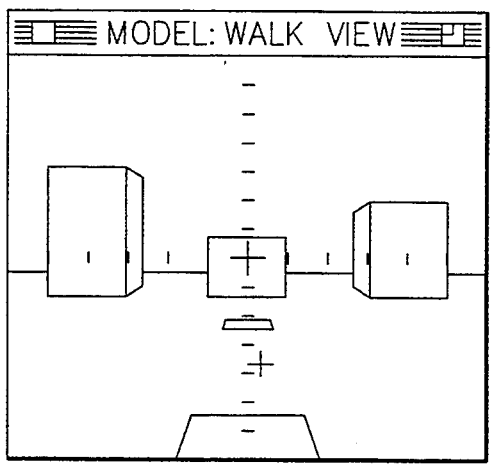
FIGS. 31A-31E graphically illustrate the results of performing the steps of FIG. 18 for decreasing pitch, according to the present invention.
Figure 31B:
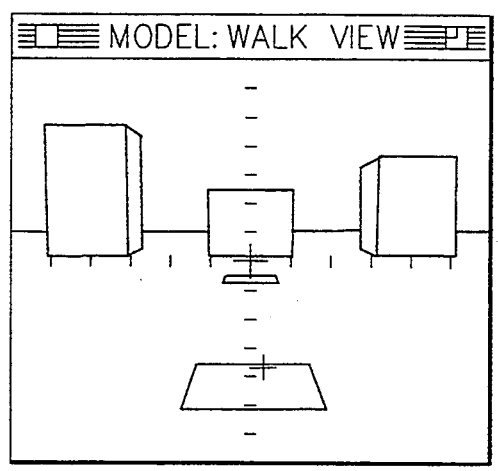
Figure 31C:
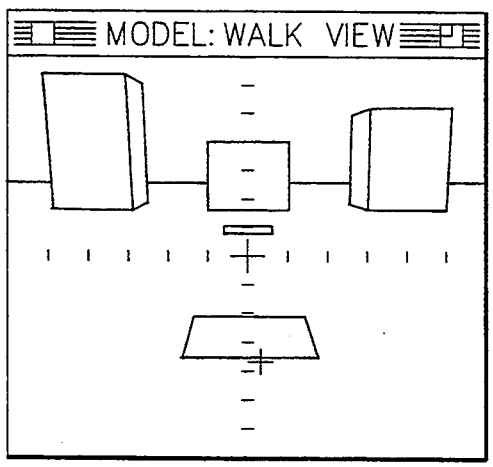
Figure 31D:
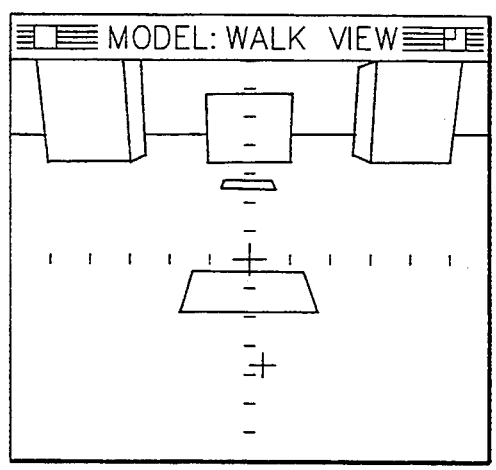
Figure 31E:
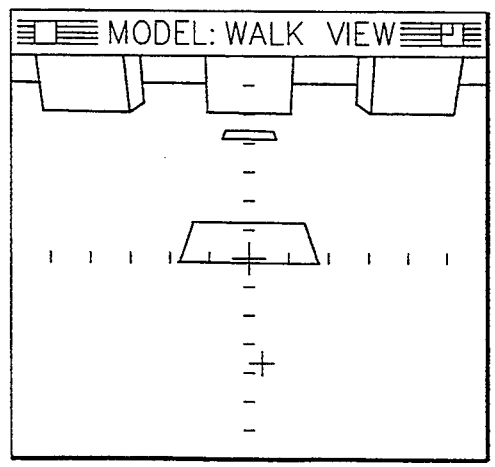
Figure 32A:
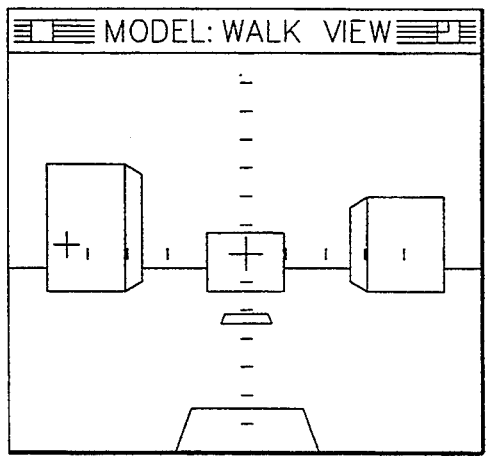
FIGS. 32A-32E graphically illustrate the results of performing the steps of FIG. 19 for rolling to the left, according to the present invention.
Figure 32B:
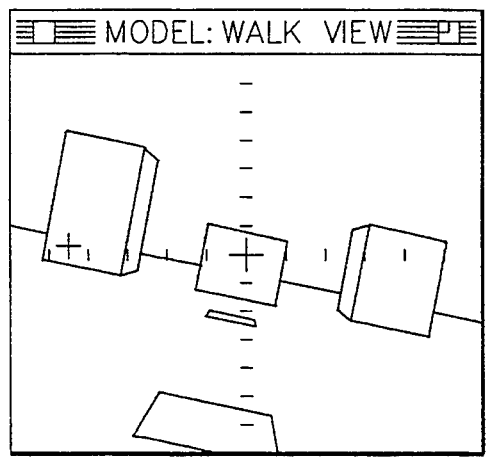
Figure 32C:
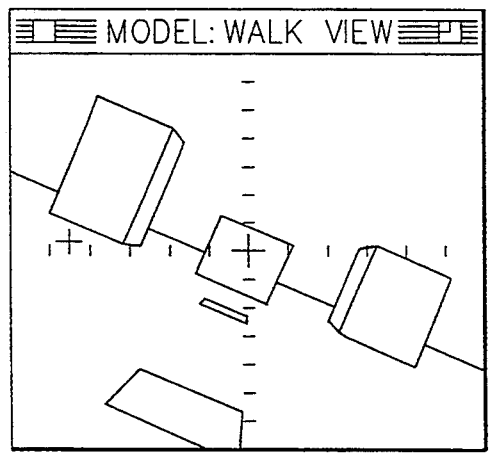
Figure 32D:
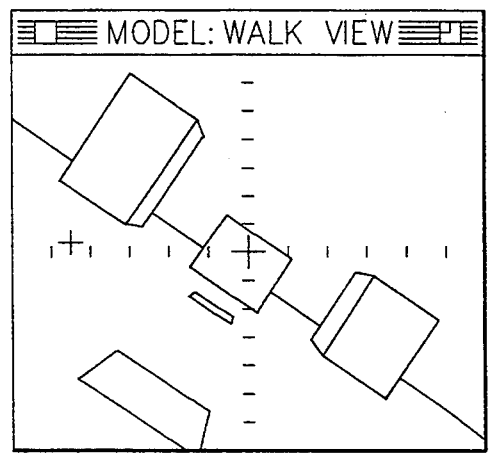
Figure 32E:
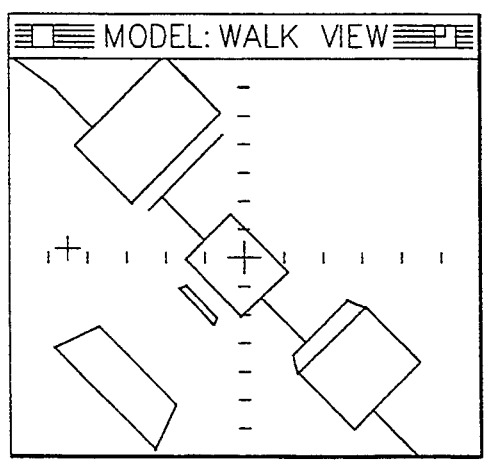
Figure 33A:
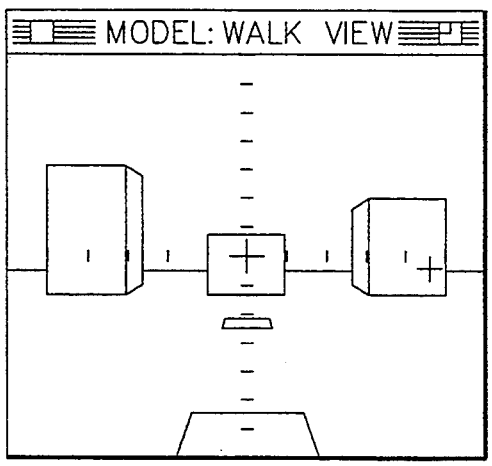
FIGS. 33A-33E graphically illustrate the results of performing the steps of FIG. 19 for rolling to the right, according to the present invention.
Figure 33B:
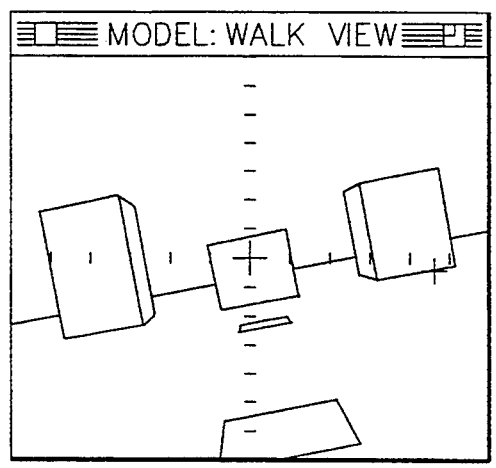
Figure 33C:
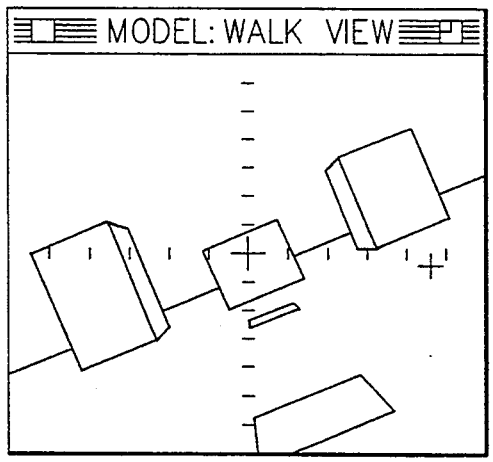
Figure 33D:
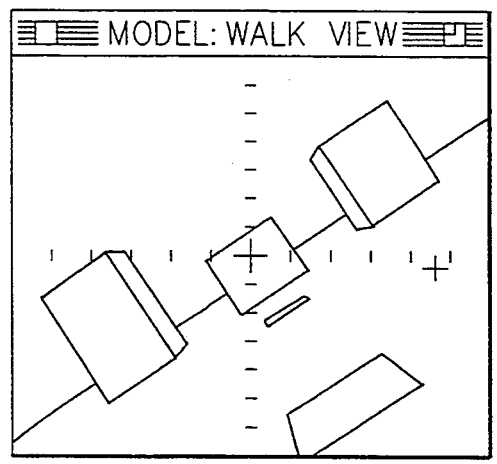
Figure 33E:
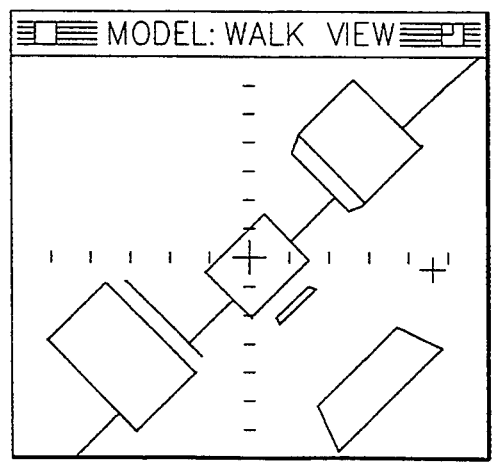

Finally, FIG. 19 illustrates the steps in rolling to the left or right in response to selection of the second function selection key and movement of the mouse to the left or right. FIGS. 32A–32E and 33A–33E illustrate the results of these steps on a graphics representation of the three-dimensional space for rolling to the left or rolling to the right respectively.

It will be understood by those having skill in the art that the individual steps for performing the individual functions to move along six degrees of freedom are known. However, it has heretofore not been known to use these steps in combination with movement of a mouse and selection of a pair of selecting means, in the particular relationship described, to effect user-intuitive movement through a two-dimensional representation of a three-dimensional space with all six degrees of freedom.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A graphics display system comprising:
   two-dimensional graphics displaying means; and
   graphics processing means for a plurality of three-dimensional objects, a first one of said objects being contained within a second one of said objects, said graphics processing means comprising:
   means for representing said plurality of three-dimensional objects as a corresponding plurality of convex polyhedra;
   means for indicating containment relationships among said plurality of convex polyhedra corresponding to containment relationships among said plurality of three-dimensional objects, including said first object which is contained within said second object; and
   means for rendering a two-dimensional representation of the plurality of three-dimensional objects by selectively rendering only some of said convex polyhedra on said graphics displaying means, based upon the containment relationships in said containment indicating means, such that said first object is not rendered on said graphics displaying means upon rendering said second object from a perspective outside said second object, and said second object is not rendered on said graphics displaying means upon rendering said first object from a perspective inside said first object.

2. The graphics display system of claim 1 wherein said containment indicating means comprises a containment logical tree for indicating said containment relationships.

3. The graphics display system of claim 1 further comprising means for indicating connection relationships among said plurality of three-dimensional objects.

4. The graphics display system of claim 1 wherein said connection indicating means comprises means for indicating connection of at least a first surface of a third one of said convex polyhedra to at least a second surface of a fourth one of said convex polyhedra.

5. The graphics display system of claim 4 wherein said connection indicating means further comprises means for indicating a location of at least one hole between said at least a first surface which is connected to said at least a second surface.

6. The graphics display system of claim 3 wherein said connection indicating means comprises a connection logical graph for indicating said connection relationships.

7. A graphics display method for displaying a plurality of three-dimensional objects, a first one of said objects being contained within a second one of said objects, said graphics display method comprising the steps of:
   representing in a graphics processor, said plurality of three-dimensional objects as a corresponding plurality of convex polyhedra;
   generating in the graphics processor, a representation of containment relationships among said plurality of convex polyhedra corresponding to containment relationships among said plurality of three-dimensional objects including said a first object which is contained within said second object; and
   displaying the plurality of convex polyhedra on a two-dimensional display by selectively rendering only some of said polyhedra on said two-dimensional display based on the containment relationships represented in the graphics processor, such that said first object is not rendered on said graphics display upon rendering said second object from a perspective outside said second object, and said second object is not rendered on said graphics display upon rendering said first object from a perspective inside said first object.

8. The graphics display method of claim 7 wherein said generating step comprises the step of generating a containment logical tree for indicating the containment relationships among said plurality of convex polyhedra.

9. The graphics display method of claim 7 further comprising the step of generating a representation of the connection relationships among said plurality of convex polyhedra corresponding to connection relationships among said plurality of three-dimensional objects.

10. The graphics display method of claim 9 wherein said connection relationships generating step comprises the step of representing that at least a first surface of a third one of said convex polyhedra is connected to at least a second surface of a fourth one of said convex polyhedra.

11. The graphics display method of claim 10 wherein said surface connection representing step further comprises the step of representing a location of at least one hole between said at least a first surface which is connected to said at least second surface.

12. The graphics display method of claim 9 wherein said connection relationships generating step comprises the step of generating a connection logical graph for representing said connection relationships.

13. Apparatus for moving through a computer-generated three-dimensional space rendition, said moving apparatus comprising:
   two-dimensional graphical display means, for displaying a three-dimensional space rendition thereon;
   two-dimensional pointing means, for moving a reference on said two-dimensional graphical display means in response to two-dimensional movement of said two-dimensional pointing means;
   function selection means;
   first means for moving in a first plane in the displayed three-dimensional space rendition, in response to movement of said two-dimensional pointing means; and
   second means for moving in a second plane in the displayed three-dimensional space rendition, in response to the combination of selection of said function selection means and two-dimensional movement of said two-dimensional pointing means;

wherein said second moving means comprises means for rising up and sinking down in a vertical plane of the displayed three-dimensional space rendition, and for moving left and moving right in the horizontal plane of the displayed three-dimensional space rendition, in response to the combination of selection of said first function selection means and forward, backward, left and right movement, respectively, of said two-dimensional pointing means.

14. The moving apparatus of claim 13 wherein said first moving means comprises means for moving forward, moving backward, turning left and turning right in a horizontal plane of the displayed three-dimensional space rendition, in response to forward, backward, left and right movement, respectively, of said two-dimensional pointing means.

15. The moving apparatus of claim 13 wherein said two-dimensional pointing means comprises a mouse, and wherein said function selection means comprises a key.

16. The moving apparatus of claim 15 wherein said key comprises a key on said mouse.

17. The moving apparatus of claim 15 further comprising a keyboard including a plurality of keys, and wherein said key comprises a predetermined one of said keyboard keys.

18. Apparatus for moving through a computer-generated three-dimensional space rendition, said moving apparatus comprising:

two-dimensional graphical display means, for displaying a three-dimensional space rendition thereon;

two-dimensional pointing means, for moving a reference on said two-dimensional graphical display means in response to two-dimensional movement of said two-dimensional pointing means;

function selection means;

first means for moving in a first plane in the displayed three-dimensional space rendition, in response to movement of said two-dimensional pointing means; and second means for moving in a second plane in the displayed three-dimensional space rendition, in response to the combination of selection of said function selection means and two-dimensional movement of said two-dimensional pointing means;

second function selection means; and means for rotating in the displayed three-dimensional space rendition, in response to the combination of selection of said second function selection means and two-dimensional movement of said two-dimensional pointing means;

wherein said rotating means comprises means for rotating up and rotating down relative to a first axis in the horizontal plane of the displayed three-dimensional space rendition, and for rotating up and rotating down relative to a second axis in the horizontal plane of the displayed three-dimensional space rendition, in response to the combination of selection of said second function selection means and forward, backward, left and right movement, respectively, of said two-dimensional pointing means.

19. Apparatus for moving through a computer-generated three-dimensional space rendition, said moving apparatus comprising:

two-dimensional graphical display means, for displaying a three-dimensional space rendition thereon;

two-dimensional pointing means, for moving a reference on said two-dimensional graphical display means in response to two-dimensional movement of said two-dimensional pointing means;

function selection means; and means for moving in six degrees of freedom through the displayed three-dimensional space rendition, said six degrees of freedom including translation along three orthogonal axes and rotation about said three orthogonal axes, in response to the combination of selection of said function selection means and two-dimensional movement of said two-dimensional pointing means;

wherein said function selection means comprises first and second function selection means;

wherein said six degrees of freedom comprise translation along mutually orthogonal x, y and z axes, and rotation about said x, y and z axes, and wherein said two-dimensional pointing means moves the reference horizontally and vertically along said graphical display means, and wherein said moving means comprises:

means for translating through the displayed three-dimensional space rendition along said y axis in response to vertical movement of said two-dimensional pointing means and for rotating about said z axis in response to horizontal movement of said two dimensional pointing means;

means for translating through the displayed three-dimensional space rendition along said z axis in response to vertical movement of said two dimensional pointing means and selection of said first function selection means, and for translating along said x axis in response to horizontal movement of said two-dimensional pointing means and selection of said first function selection means; and means for rotating in the displayed three-dimensional space rendition about said x axis in response to vertical movement of said two-dimensional pointing means and selection of said second function selection means, and for rotating about said y axis in response to horizontal movement of said two-dimensional pointing means and selection of said second function selection means.

20. The moving apparatus of claim 19 wherein said two-dimensional pointing means comprises a mouse, and wherein said function selection means comprises a key.

21. The moving apparatus of claim 20 wherein said key comprises a key on said mouse.

22. The moving apparatus of claim 20 further comprising a keyboard including a plurality of keys, and wherein said key comprises a predetermined one of said keyboard keys.

23. A graphics display system for rendering a three-dimensional space including a plurality of three-dimensional objects, a first one of said objects being contained within a second one of said objects, and for moving through the three-dimensional space rendition, said graphics display system comprising:

two-dimensional graphics displaying means;

two-dimensional pointing means, for moving a reference on said two-dimensional graphics displaying means;

function selection means; and graphics processing means, said graphics processing means comprising:

means for representing said plurality of three-dimensional objects as corresponding plurality of convex polyhedra;

means for indicating containment relationships among said plurality of convex polyhedra corresponding to containment relationships among said plurality of three-dimensional objects including said first object which is contained within said second object;

means for rendering a two-dimensional representation of the plurality of three-dimensional objects by selectively rendering only some of said convex polyhedra on said graphics displaying means, based upon the containment relationships in said containment indicating means, such that said first object is not rendered on said graphics displaying means upon rendering said second object from a perspective outside said second object, and said second object is not rendered on said graphics displaying means upon rendering said first object from a perspective inside said first object; and means for moving in six degrees of freedom through the displayed three-dimensional space rendition on said graphics displaying means, said six degrees of freedom including translation along three orthogonal axis and rotation about said three orthogonal axis, in response to the combination of selection of said function selection means and two-dimensional movement of said two-dimensional pointing means.

24. The graphics display system of claim 23 wherein said containment indicating means comprises a containment logical tree for indicating said containment relationships.

25. The graphics display system of claim 23 wherein said graphics processing means further comprises means for indicating connection relationships among said plurality of convex polyhedra.

26. The graphics display system of claim 25 wherein said connection indicating means comprises means for indicating connection of at least a first surface of a third one of said convex polyhedra to at least a second surface of a fourth one of said convex polyhedra.

27. The graphics display system of claim 26 wherein said connection indicating means further comprises means for indicating a location of at least one hole between said at least a first surface which is connected to said at least a second surface.

28. The graphics display system of claim 25 wherein said connection indicating means comprises a connection logical graph for indicating said connection relationships.

29. The graphics display system of claim 23 wherein said function selection means comprises first and second function selection means.

30. The graphics display system of claim 29 wherein said six degrees of freedom comprise translation along mutually orthogonal x,y and z axes, and rotation about said x, y and z axes, and wherein said two-dimensional pointing means moves the reference horizontally and vertically along said graphical displaying means, and wherein said moving means comprises:

means for translating through the displayed three-dimensional space rendition along said y axis in response to vertical movement of said two-dimensional pointing means and for rotating about said z axis in response to horizontal movement of said two dimensional pointing means;

means for translating through the displayed three-dimensional space rendition along said z axis in response to vertical movement of said two dimensional pointing means and selection of said first function selection means, and for translating along said x axis in response to horizontal movement of said two-dimensional pointing means and selection of said first function selection means; and means for rotating in the displayed three-dimensional space rendition about said x axis in response to vertical movement of said two-dimensional pointing means and selection of said second function selection means, and for rotating about said y axis in response to horizontal movement of said two-dimensional pointing means and selection of said second function selection means.

31. The graphics display system of claim 23 wherein said two-dimensional pointing means comprises a mouse, and wherein said function selection means comprises a key.

32. The graphics display system of claim 31 wherein said key comprises a key on said mouse.

33. The graphics display system of claim 31 further comprising a keyboard including a plurality of keys, and wherein said key comprises a predetermined one of said keyboard keys.

34. A system for rendering a plurality of three-dimensional objects, a first one of said objects being contained within a second one of said objects, said rendering system comprising:

two-dimensional graphics displaying means;

means for indicating containment relationships among said plurality of three-dimensional objects including that said first object is contained within said second object; and means for displaying a two-dimensional representation of said plurality of objects on said two-dimensional graphics displaying means, from a display perspective which is outside said second object, by rendering said second object and by not rendering said first object, based upon the containment relationships in said containment indicating means, and for displaying a two-dimensional representation of said plurality of objects on said two-dimensional graphics displaying means, from a display perspective which is inside said first object, by rendering said first object and by not rendering said second object, based upon the containment relationships in said containment indicating means.

35. The rendering system of claim 34 wherein said containment indicating means comprises a containment logical tree for indicating said containment relationships.

36. The rendering system of claim 34 further comprising means for indicating connection relationships among said plurality of three-dimensional objects.

37. The rendering system of claim 36 wherein said connection indicating means comprises means for indicating connection of at least a first surface of a third one of said convex polyhedra to at least a second surface of a fourth one of said convex polyhedra.

38. The rendering system of claim 36 wherein said connection indicating means comprises a connection logical graph for indicating said connection relationships.

39. The rendering system of claim 37 wherein said connection indicating means further comprises means for indicating a location of at least one hole between said at least a first surface which is connected to said at least a second surface.

40. A method for rendering a plurality of three-dimensional objects, a first one of said objects being contained within a second one of said objects, said rendering method comprising the steps of:

indicating in a graphics processor, containment relationships among said plurality of three-dimensional objects including that said first object is contained within said second object;

displaying a two-dimensional representation of said plurality of objects on a two-dimensional graphics display, from a display perspective which is outside said second object, by rendering said second object and by not rendering said first object, based upon the containment relationships in the graphics processor; and displaying a two-dimensional representation of said plurality of objects in said two-dimensional graphics display, from a display perspective which is inside said first object, by rendering said first object and by not rendering said second object, based upon the containment relationships in the graphics processor.

41. The rendering method of claim 40 wherein said indicating step comprises the step of generating a containment logical tree in the graphics processor, for indicating the containment relationships among said plurality of three-dimensional objects.

42. The rendering method of claim 40 further comprising the step of generating a representation of the connection relationships among said plurality of three-dimensional objects.

43. The rendering method of claim 42 wherein said connection relationships generating step comprises the step of representing that at least a first surface of a third one of said three-dimensional objects is connected to at least a second surface of a fourth one of said three-dimensional objects.

44. The rendering method of claim 42 wherein said connection relationships generating step comprises the step of generating a connection logical graph in the graphics processor for representing said connection relationships.

45. The rendering method of claim 43 wherein said surface connection representing step further comprises the step of representing a location of at least one hole between the at least a first surface which is connected to said at least a second surface.

* * * * *